United States Patent
Jiang

(10) Patent No.: US 12,386,854 B2
(45) Date of Patent: Aug. 12, 2025

(54) DATA SYNCHRONIZATION METHOD AND APPARATUS

(71) Applicant: Huawei Technologies Co., Ltd., Guangdong (CN)

(72) Inventor: Jianyu Jiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 18/146,955

(22) Filed: Dec. 27, 2022

(65) Prior Publication Data

US 2023/0137609 A1 May 4, 2023

Related U.S. Application Data

(63) Continuation of application No. PCT/CN2021/101223, filed on Jun. 21, 2021.

(30) Foreign Application Priority Data

Jun. 30, 2020 (CN) .......................... 202010617593.1

(51) Int. Cl.
*G06F 16/27* (2019.01)
*G06F 9/48* (2006.01)

(52) U.S. Cl.
CPC ............ *G06F 16/27* (2019.01); *G06F 9/4881* (2013.01)

(58) Field of Classification Search
CPC .... G06F 16/27; G06F 9/4881; G06F 11/1448; G06F 11/1464; G06F 16/23; G06F 9/00;

(Continued)

(56) References Cited

U.S. PATENT DOCUMENTS 7,844,973 B1 * 11/2010 Dice .................... G06F 9/52
710/200
2010/0250809 A1 * 9/2010 Ramesh ................. G06F 9/526
710/200

(Continued)

FOREIGN PATENT DOCUMENTS

CN 102841810 A 12/2012
CN 104978006 A 10/2015

(Continued)

*Primary Examiner* — Evan Aspinwall
(74) *Attorney, Agent, or Firm* — WOMBLE BOND DICKINSON (US) LLP

(57) ABSTRACT

Embodiments of this application provide a data synchronization method, and this method may be applied to a database-related field. The data synchronization method provided in this application includes: a primary server sending, by using a data synchronization process, first data generated by a first process to a secondary server, wherein the secondary server synchronizes the first data; and the data synchronization process waking up a second process based on completion of synchronization of the first data by the secondary server, and the second process further waking up the first process to perform a subsequent operation. The data synchronization process disclosed herein does not need to wake up the first process that has completed data synchronization, but only needs to wake up the second process, and the second process wakes up the first process that has completed data synchronization.

21 Claims, 16 Drawing Sheets

(58) Field of Classification Search
CPC .......... G06F 9/5027; G06F 9/52; G06F 9/524;
G06F 9/526; G06F 9/546; G06F
2209/548; G06F 2201/80; G06F 3/0611;
G06F 11/2097; G06F 9/3856
USPC ........................................................ 707/610
See application file for complete search history.

(56) References Cited

U.S. PATENT DOCUMENTS

| | | | | |
|---|---|---|---|---|
| 2012/0291034 | A1* | 11/2012 | Kamath | G06F 9/52 |
| | | | | 718/102 |
| 2013/0117226 | A1* | 5/2013 | Jain | G06F 16/27 |
| | | | | 707/625 |
| 2014/0108839 | A1* | 4/2014 | Horikawa | G06F 1/3234 |
| | | | | 713/323 |
| 2015/0227401 | A1* | 8/2015 | Tillier | G06F 9/547 |
| | | | | 719/313 |
| 2016/0350193 | A1* | 12/2016 | Katou | G06F 11/2097 |
| 2018/0173779 | A1* | 6/2018 | Lee | G06F 9/505 |
| 2018/0322157 | A1* | 11/2018 | Lee | G06F 16/2379 |
| 2021/0026707 | A1* | 1/2021 | Rosenberg | G06F 9/45558 |

FOREIGN PATENT DOCUMENTS

| | | |
|---|---|---|
| CN | 107436798 A | 12/2017 |
| CN | 110807062 A | 2/2020 |

\* cited by examiner

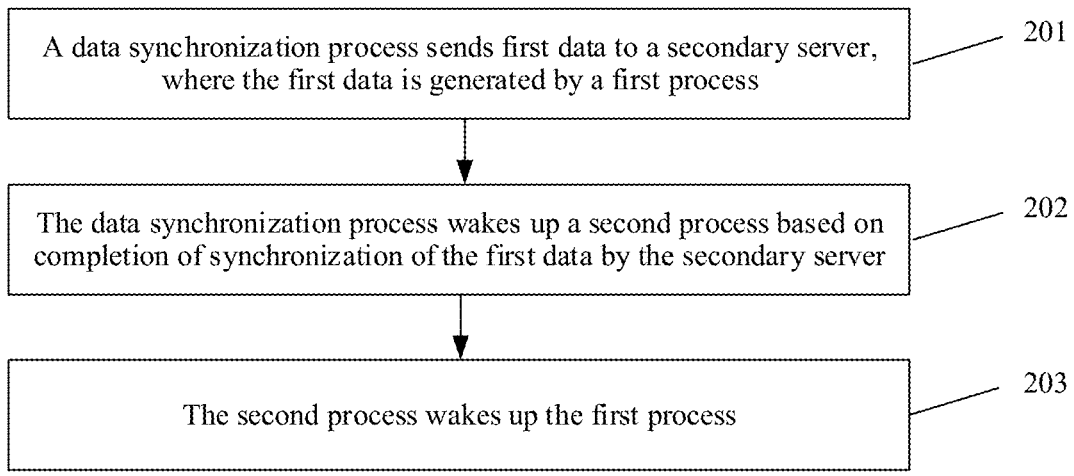
FIG. 2
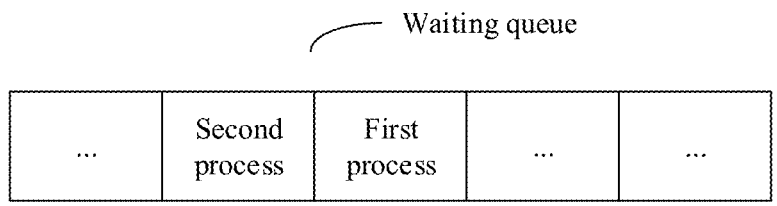
FIG. 3
FIG. 4a

DATA SYNCHRONIZATION METHOD AND APPARATUS

CROSS-REFERENCE TO RELATED APPLICATIONS

This application is a continuation of International Application No. PCT/CN2021/101223, filed on Jun. 21, 2021, which claims priority to Chinese Patent Application No. 202010617593.1, filed on Jun. 30, 2020. The disclosures of the aforementioned applications are hereby incorporated by reference in their entireties.

TECHNICAL FIELD

This application relates to the field of computer databases, and in particular, to a data backup method and apparatus.

BACKGROUND

To improve availability of a database system, a secondary server is usually used to synchronize data including a data operation record, and perform, based on the data including the data operation record, a data operation that is same as a data operation of a primary server. When the primary server is faulty, the secondary server provides services for external systems.

There are generally two types of methods for data synchronization between the primary (master) server and the secondary (standby) server. The first method is synchronous replication. When a transaction of the primary server is committed, the data including the data operation record needs to be synchronously written into a file of the primary server. In addition, the data including the data operation record also needs to be written into a file of the secondary server, and then it can be considered that the transaction can be committed. The other method is asynchronous replication. After a transaction of the primary server completes writing the data including the data operation record into a local file, it is directly considered that the transaction is committed without waiting for completion of synchronization on the secondary server.

Compared with the asynchronous replication method, in the synchronous replication method, the primary server needs to wait for the secondary server to synchronize. As a result, a transaction submission latency increases significantly, and performance of synchronous replication is much lower than performance of asynchronous replication. However, if the primary server is faulty, and the asynchronous replication method is used, committed transactions may not be synchronized to the secondary server. When a failover occurs, information may be lost and problems may be caused. Therefore, a synchronous replication technology is used in scenarios that require high reliability and availability.

Sometimes, a data synchronization process of the primary server may trigger the secondary server to perform data synchronization, and when the secondary server performs data synchronization, a transaction process related to the primary server is in a sleep state. After the secondary server completes the synchronization, the data synchronization process of the primary server needs to wake up corresponding transaction processes in sequence. After the data synchronization process completes wake-up of the transaction processes, the data synchronization process may continue to trigger the secondary server to synchronize data.

However, in some scenarios, there are a large quantity of transaction processes that need to be woken up by the data synchronization process. In this case, the data synchronization process needs to spend a lot of time to wake up the transaction processes. As a result, a large quantity of transaction processes enter the sleep state due to waiting for data synchronization, and a transaction processing latency of a transaction process is increased.

SUMMARY

According to a first aspect, an embodiment of this application provides a data synchronization method, wherein the method includes:

A data synchronization process sending first data to a secondary server, wherein the first data is generated by a first process. The first process may be a transaction process running on a primary server. When the primary server receives an operation instruction sent by a user to perform a transaction such as a read/write operation, the primary server may generate a corresponding transaction process. The transaction process includes an operation corresponding to the operation instruction sent by the user, and the transaction process may perform a corresponding operation on a storage device in a database, wherein the operation may include adding data, deleting data, modifying data, querying data, and the like. The first data may be, but is not limited to, a transaction log for dealing with crash recovery (database transaction log for dealing with crash recovery, XLOG). The secondary server may obtain, based on the data, an operation performed by a transaction process of the primary server, and perform a same operation, to synchronize data of the primary server on the secondary server. The method further includes: the data synchronization process waking up a second process based on completion of synchronization of the first data by the secondary server; and after the data synchronization process receives synchronization progress sent by the secondary server, the data synchronization process may wake up the second process, and the second process wakes up the first process, that is, the second process wakes up a transaction process. In some embodiments, the data synchronization process may traverse a waiting queue, separate a transaction process (including the first process) that has completed data synchronization from the waiting queue based on completion progress, and generate a completion queue (including the first process). The completion queue may be temporarily generated, and after all transaction processes in the completion queue are woken up, the completion queue may no longer exist. The data synchronization process may wake up the second process, and the second process may wake up the first process in the completion queue, that is, the second process wakes up the transaction process. It should be noted that the data synchronization process may first generate a completion queue including the first process, and then wake up the second process; or the data synchronization process may first wake up the second process, and then generate a completion queue including the first process. A sequence of generating the completion queue and waking up the second process is not limited herein and foregoing queues (the completion queue and the waiting queue) are merely an exemplary embodiment. In various embodiments of the current disclosure, the queues may be alternatively replaced with other data structures that have a same or similar data structure.

In many embodiments, the second process may not be a transaction process, but a process independently used to wake up a transaction process. In many such embodiments, the second process may be started when a database service is started, and the second process is in a sleep state when no transaction process needs to be woken up. In several embodiments, after the second process is woken up by the data synchronization process, the second process may wake up the transaction process and enter the sleep state after the transaction process is woken up.

In some embodiments of the current disclosure, the data synchronization process does not need to wake up a transaction process that has completed data synchronization, but only needs to wake up a process specially used for waking up a process that has completed data synchronization. In this way, the data synchronization process can be more focused on triggering the secondary server to perform data synchronization and receiving synchronization progress of the secondary server. Therefore, load of the data synchronization process is relieved, and time for the data synchronization process to wake up a transaction process is reduced.

In one or more embodiments, the method further includes, before the data synchronization process sends the first data to the secondary server, the data synchronization process receiving a data synchronization request corresponding to the first process.

In some embodiments, the first process is configured to perform a first operation on a database, and the first data includes an operation record corresponding to the first operation.

In many embodiments, the method further includes the data synchronization process sending second data to the secondary server, wherein the second data is generated by the second process; and the data synchronization process waking up the second process based on completion of synchronization of the first data and the second data by the secondary server.

In various embodiments, the second process is configured to perform a second operation on the database, and the second data includes an operation record corresponding to the second operation.

In several embodiments, the primary server includes a completion queue, and an identifier of the second process is located in a first element of the completion queue; and that the second process is woken up includes waking up a process corresponding to the identifier included in the first element.

In some embodiments, before the second process is woken up, and after the secondary server completes synchronization of the first data, the completion queue is generated based on at least the identifier of the second process, where the identifier of the second process is located in the first element of the completion queue.

In one or more embodiments, the first element is a head element of the completion queue.

In various embodiments, an identifier of the first process is located in a second element of the completion queue, and the second element follows the first element in the completion queue; and the second process wakes up a process corresponding to the identifier included in the second element.

In many embodiments, the second process may wake up processes corresponding to identifiers included in a plurality of elements that are in the completion queue and that follow the first element.

In several embodiments of the current disclosure, the second process instead of the data synchronization process may wake up another process in the completion queue. In several such embodiments, the second process needs to detect whether a subsequent element of the completion queue includes another transaction process, and if the subsequent element of the completion queue includes the other transaction process, the second process is responsible for waking up a remaining transaction process in the completion queue.

In one or more embodiments, the second element is adjacent to the first element, and the second process may wake up a process included in an element that is in the completion queue and that is adjacent to the first element and that follows the first element.

In some embodiments, the primary server includes a waiting queue, before the secondary server completes the synchronization, the identifier of the second process is located in a third element in the waiting queue, the identifier of the first process is located in a fourth element in the waiting queue, and the fourth element follows the third element; and the completion queue is generated based on the waiting queue.

In some such embodiments, the generated completion queue maintains an original sequence of processes in the waiting queue. This ensures first in first out of transaction processing.

In many embodiments, the completion queue includes one or more parts of the waiting queue.

In various embodiments, relative locations of the third element and the fourth element in the waiting queue are the same as relative locations of the first element and the second element in the completion queue. In various such embodiments, an interval and a sequence between an element in which the second process is located and an element in which the first process is located remain unchanged.

In one or more embodiments, the identifier of the second process is located in a head element of the waiting queue, and the identifier of the first process is located in an element other than the head element in the waiting queue.

In one or more such embodiments, if the identifier of the second process is located in an element other than a head element in the completion queue, the data synchronization process may wake up a process included in the head element and processes corresponding to identifiers included in sequentially adjacent elements until the second process is woken up.

In several embodiments, the primary server includes a completion queue, and an identifier of the first process is located in a first element of the completion queue; and the second process is located outside the completion queue; and that the second process wakes up the first process includes: The second process wakes up a process corresponding to the identifier included in the first element.

In several such embodiments, the second process may not be a transaction process, but a process independently used to wake up a transaction process. The first process is a process corresponding to an identifier included in any element in the waiting queue. In some such embodiments, the completion queue is generated based on at least an identifier of the first process, where the identifier of the first process is located in the first element of the completion queue, and the second process wakes up a process corresponding to the identifier included in the first element.

In various embodiments, the method further includes, before the second process wakes up the first process, and after the secondary server completes synchronization of the first data, generating the completion queue based on at least the identifier of the first process, wherein the identifier of the first process is located in the first element of the completion queue.

In one or more embodiments, the primary server includes a waiting queue, before the secondary server completes the synchronization, the identifier of the first process is located in a fourth element in the waiting queue, and the completion queue is generated based on the waiting queue.

In several embodiments, the completion queue includes one or more parts of the waiting queue.

In some embodiments, the first process and the second process run on the primary server, the primary server includes a plurality of NUMA nodes, and the second process and the first process belong to a process included in a same NUMA node.

In various embodiments, the first process and the second process run on the primary server, the primary server includes a plurality of NUMA nodes, and the completion queue and at least one of the second process and the first process belong to a same NUMA node.

In many embodiments, the first process and the second process run on the primary server, the primary server includes a plurality of NUMA nodes, and the waiting queue and at least one of the second process and the first process belong to a same NUMA node; and/or the completion queue and the waiting queue belong to a same NUMA node.

In many such embodiments, the completion queue and the waiting queue belong to a same NUMA node. Data related to the second process and data related to the first process occupy a memory resource in a same NUMA node. Data related to the completion queue and data related to the waiting queue occupy a memory resource in a same NUMA node.

In further such embodiments, when the database system is initialized, a corresponding waiting queue may be allocated to each NUMA node, and transaction processes (e.g., the second process and the first process) may be allocated to a waiting queue of the node. Similarly, a completion queue separated from the waiting queue may also be located on this node. Based on this, when the completion queue traverses and wakes up the transaction processes, a process and accessed data are located on a same NUMA node. This avoids remote memory access with high costs, and further improves efficiency of a parallel wake-up mechanism.

According to a second aspect, this application provides a data writing method. The method including a data writing process waking up a second process based on completion of a write operation on first data, wherein the first data is generated by a first process; and the second process waking up the first process.

In some such embodiments, after the data writing process completes the write operation on the first data, the data writing process may wake up the second process, and then the second process independently wakes up a process, or the second process and other remaining processes in the completion queue jointly wake up a process. Therefore, time for a local data writing process to wake up a transaction process can be reduced, and efficiency of a file write operation can be improved.

In one or more embodiments, the first process is configured to perform a first operation on a database, and the first data includes an operation record corresponding to the first operation.

Many embodiments including the data writing process waking up a second process based on completion of a write operation on first data may further include the data writing process waking up the second process based on completion of a write operation on the first data and second data, wherein the second data is generated by the second process.

In some embodiments, the second process is configured to perform a second operation on the database, and the second data includes an operation record corresponding to the second operation.

In various embodiments, a primary server includes a completion queue, and an identifier of the second process is located in a first element of the completion queue; and waking up the second process includes waking up a process corresponding to the identifier included in the first element.

In one or more embodiments, the method further includes, before the second process is woken up, and after the data writing process completes the write operation on the first data, the data writing process generating the completion queue based on at least the identifier of the second process, wherein the identifier of the second process is located in the first element of the completion queue.

In various embodiments, the first element is a head element of the completion queue.

In one or more embodiments, an identifier of the first process is located in a second element of the completion queue, and the second element follows the first element in the completion queue; and wherein the second process waking up the first process includes waking up a process corresponding to the identifier included in the second element.

In several embodiments, the second process waking up a process included in the second element includes the second process waking up processes corresponding to identifiers included in a plurality of elements that are in the completion queue and that follow the first element.

In some embodiments, the second element is adjacent to the first element; and wherein the second process waking up a process included in the second element includes the second process waking up a process included in an element in the completion queue, wherein the element in the completion queue is adjacent to the first element and follows the first element.

In many embodiments, the primary server includes a waiting queue, before the data writing process completes the write operation on the first data, the identifier of the second process is located in a third element in the waiting queue, the identifier of the first process is located in a fourth element in the waiting queue, and the fourth element follows the third element; and the completion queue is generated based on the waiting queue.

In one or more embodiments, the completion queue includes one or more parts of the waiting queue.

In many embodiments, relative locations of the third element and the fourth element in the waiting queue are the same as relative locations of the first element and the second element in the completion queue.

In various embodiments, the identifier of the second process is located in a head element of the waiting queue, and the identifier of the first process is located in an element other than the head element in the waiting queue.

In some embodiments, the primary server includes a completion queue, and an identifier of the first process is located in a first element of the completion queue; and the second process is located outside the completion queue; and wherein the second process waking up the first process includes the second process waking up a process corresponding to the identifier included in the first element.

In one or more embodiments, the method further includes, before the second process wakes up the first process, and after the secondary server completes synchronization of the first data, generating the completion queue based on at least the identifier of the first process, wherein the identifier of the first process is located in the first element of the completion queue.

In some embodiments, the primary server includes a waiting queue, and before the data writing process completes the write operation on the first data, the identifier of the first process is located in a fourth element in the waiting queue; and the completion queue is generated based on the waiting queue.

In one or more embodiments, the completion queue includes one or more parts of the waiting queue.

In various embodiments, the first process and the second process run on the primary server, the primary server includes a plurality of NUMA nodes, and the second process and the first process belong to a process included in a same NUMA node.

In several embodiments, the first process and the second process run on the primary server, the primary server includes a plurality of NUMA nodes, and the completion queue and at least one of the second process and the first process belong to a same NUMA node.

In many embodiments, the first process and the second process run on the primary server, the primary server includes a plurality of NUMA nodes, and the waiting queue and at least one of the second process and the first process belong to a same NUMA node; and/or the completion queue and the waiting queue belong to a same NUMA node.

According to a third aspect, this application provides a data synchronization apparatus. The apparatus may include a processor, the processor is coupled to a memory, the memory stores program instructions, and when the program instructions stored in the memory are executed by the processor, the method according to any one of the first aspect or the possible embodiments of the first aspect is implemented. For details about the operations performed by the processor in the possible embodiments of the first aspect, refer to the first aspect. Details are not described herein again.

According to a fourth aspect, this application provides a data writing apparatus. The apparatus may include a processor, the processor is coupled to a memory, the memory stores program instructions, and when the program instructions stored in the memory are executed by the processor, the method according to any one of the second aspect or the possible embodiments of the second aspect is implemented. For details about the operations performed by the processor in the second aspect and the possible embodiments of the second aspect, refer to the second aspect. Details are not described herein again.

According to a fifth aspect, this application provides a computer-readable storage medium. The computer-readable storage medium stores a computer program, and when the computer program runs on a computer, the computer is enabled to perform the method according to any one of the first aspect or the possible embodiments of the first aspect.

According to a sixth aspect, this application provides a computer-readable storage medium. The computer-readable storage medium stores a computer program, and when the computer program runs on a computer, the computer is enabled to perform the method according to any one of the second aspect or the possible embodiments of the second aspect.

According to a seventh aspect, this application provides a circuit system. The circuit system includes a processing circuit, and the processing circuit is configured to perform the method according to any one of the first aspect and the possible embodiments of the first aspect.

According to an eighth aspect, this application provides a circuit system. The circuit system includes a processing circuit, and the processing circuit is configured to perform the method according to any one of the second aspect and the possible embodiments of the second aspect.

According to a ninth aspect, this application provides a computer program. When the computer program runs on a computer, the computer is enabled to perform the method according to any one of the first aspect and the possible embodiments of the first aspect.

According to a tenth aspect, this application provides a computer program. When the computer program runs on a computer, the computer is enabled to perform the method according to any one of the second aspect and the possible embodiments of the second aspect.

According to an eleventh aspect, this application provides a chip system. The chip system includes a processor, configured to support a server or a threshold obtaining apparatus in implementing functions in the foregoing aspects, for example, sending or processing data and/or information in the foregoing methods. In a possible design, the chip system further includes a memory. The memory is configured to store program instructions and data that are necessary for the server or a communication device. The chip system may include a chip, or may include a chip and another discrete component.

BRIEF DESCRIPTION OF DRAWINGS

FIG. 2 is a schematic diagram of connection between two nodes in a NUMA architecture;

FIG. 3 is a schematic diagram of a process processing procedure;

FIG. 4*a* is a schematic diagram of a structure of a waiting queue;

DESCRIPTION OF EMBODIMENTS

The following describes embodiments of this application with reference to accompanying drawings. It is clear that the described embodiments are merely some rather than all of embodiments of this application. A person of ordinary skill in the art will appreciate that, with development of technologies and emergence of a new scenario, the technical solutions provided in embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances so that embodiments described herein can be implemented in other orders than the order illustrated or described herein. Moreover, the terms "include", "have" and any other variants mean to cover the non-exclusive inclusion, for example, a process, method, system, product, or device that includes a list of operations or modules is not necessarily limited to those modules, but may include other modules not expressly listed or inherent to such a process, method, system, product, or device. Naming or numbering of operations in this application does not mean that operations in a method procedure need to be performed according to a time/logical sequence indicated by the naming or the numbering. An execution sequence of operations in a procedure that have been named or numbered may be changed based on a technical objective to be implemented, provided that a same or similar technical effect can be achieved.

Figure 1:
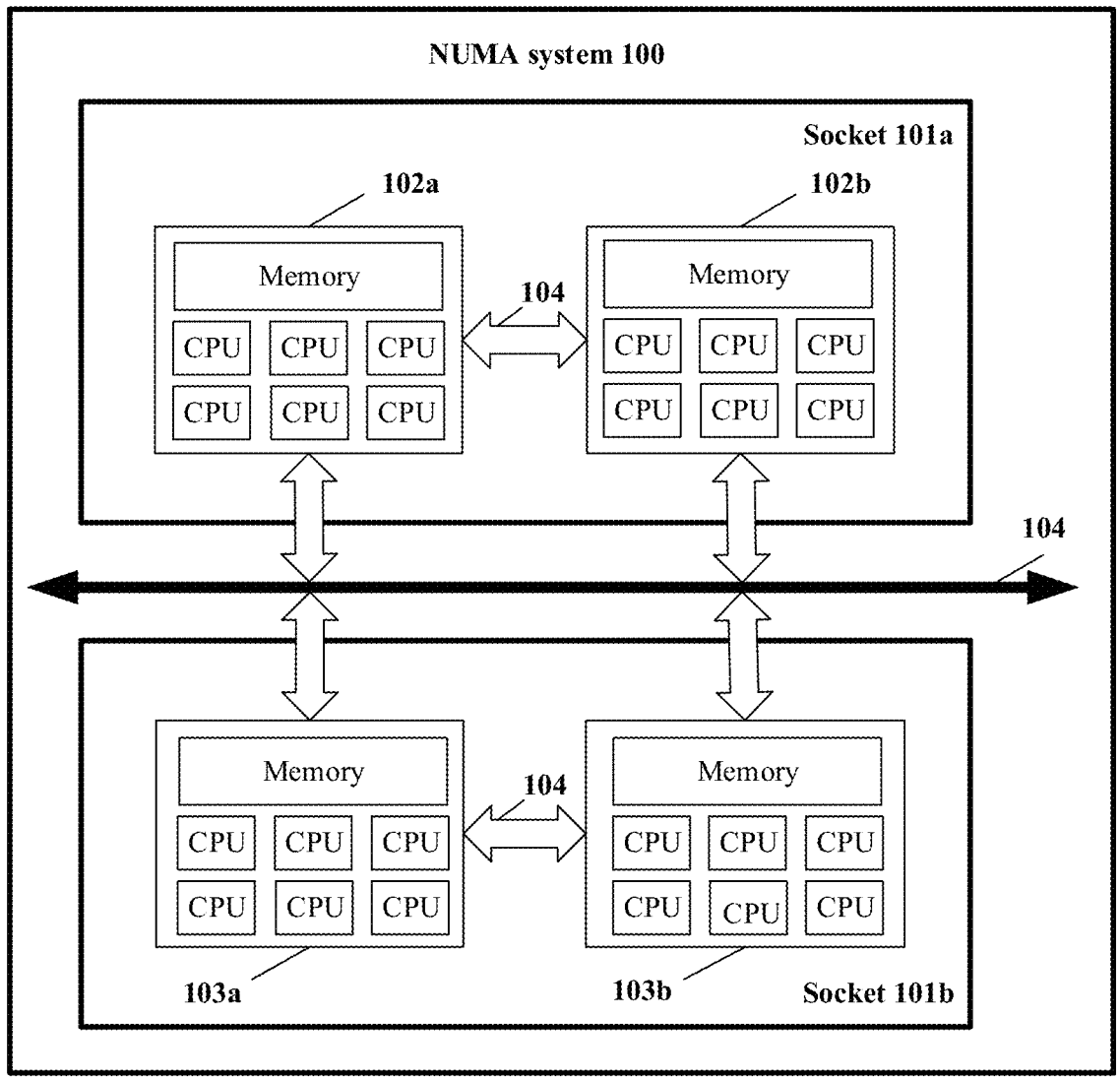
FIG. 1 is a schematic diagram of an architecture of a NUMA system according to an embodiment of this application.

A database system in embodiments of this application may include a primary server and a secondary server. The following first describes an application scenario of this application. The primary server and the secondary server in embodiments of this application may be NUMA-based systems. An architecture of a NUMA system 100 may be a multi-socket system 100. FIG. 1 is a schematic diagram of an architecture of the NUMA system 100 according to an embodiment of this application. As shown in FIG. 1, the NUMA system 100 includes a socket (socket) 101a and a socket 101b. The socket 101a and the socket 101b may be collectively referred to as sockets in this disclosure, and may be configured to accommodate a central processing unit (central processing unit, CPU). Sockets may be communicatively coupled to each other through an interconnection (interconnect) 104. For example, each socket may be connected to each of other sockets over a point-to-point quick path interconnect (quick path interconnect, QPI) link. It should be noted that QPI is an interconnection architecture. Interconnection between sockets in this embodiment of this application may alternatively be implemented by using another interconnection architecture, such as another point-to-point architecture, a ring architecture, or a bus architecture. This is not limited herein. A quantity of sockets depicted in the NUMA system 100 is merely an example, and a person skilled in the art will understand that there may be different quantities of sockets. For example, the NUMA system 100 may include, for example, six, four, or fewer sockets, or the NUMA system 100 may include, for example, sixteen, thirty-two, or more sockets.

The socket may include a plurality of nodes (node), each node has its own CPU and memory, and the nodes are connected and communicate with each other through the interconnection 104. As shown in FIG. 1, the socket 101a includes a node 102a and a node 102b, the socket 101b includes a node 103a and a node 103b, and each node includes one memory and six CPUs. It should be noted that a quantity of nodes and a quantity of CPUs depicted in the NUMA system 100 are merely an example, and a person skilled in the art will understand that each socket may include another quantity of nodes, and each node may include another quantity of CPUs.

In this embodiment of this application, software of a primary server relates to a transaction process, a data synchronization process, a waiting queue, and the like, and software of a secondary server mainly relates to a data synchronization process. In a conventional implementation, main data synchronization procedures are as follows.

1. When a transaction process of a primary server is about to commit a transaction, the transaction process of the primary server first commits local data, then sends a synchronization request to a data synchronization process of the primary server, and adds the transaction process of the primary server to a waiting queue.

2. The data synchronization process of the primary server responds to the request and sends the data to a secondary server.

3. A data synchronization process of the secondary server receives and writes the data into a file system of the secondary server.

4. The data synchronization process of the secondary server reports synchronization progress to the primary server.

5. The data synchronization process of the primary server traverses the waiting queue based on the synchronization progress and wakes up transaction processes that have been synchronized one by one. After the foregoing procedures are completed, the transaction process can complete a transaction commit operation.

The data synchronization process of the primary server cyclically performs the following operations.

1. The data synchronization process of the primary server is woken up by the transaction process, reads unsynchronized data, and sends the data to the secondary server through a network.

2. The data synchronization process of the primary server waits for a progress indication sent by the secondary server.

3. The data synchronization process of the primary server traverses the waiting queue based on current progress and wakes up a transaction process that has completed synchronization in the queue.

However, as a quantity of central processing unit (CPU) cores and a quantity of non-uniform memory access (NUMA) nodes continuously increase, and a single server has an increasingly higher capability, there are also some limitations, such as wake-up time of a transaction process is long, which affects efficiency of the data synchronization process of the primary server.

These limitations may be caused by one or more of the following reasons.

1. A process wake-up operation is performed by the data synchronization process of the primary server. As a multi-core capability of the single server improves, a concurrency of supported transaction processes also increases greatly. Therefore, a quantity of processes in the waiting queue at the same time increases greatly, and time for traversing the waiting queue and waking up processes in the waiting queue increases significantly. As a result, a processing period of the data synchronization process of the primary server is prolonged.

2. Affected by the fact that the process wake-up operation is performed by the data synchronization process of the primary server, wake-up of a transaction process is also inefficient. Even if data synchronization is complete on the secondary server, a transaction process at a tail of the queue needs to wait for a long time to be woken up.

3. For a server with a plurality of NUMA nodes, access to the waiting queue requires a large amount of memory access across NUMA nodes. Compared with a single-node server, access costs of the server with the plurality of NUMA nodes are further increased.

To resolve the foregoing problem, this application provides a data backup method. FIG. 2 is a schematic flowchart of a data backup method according to an embodiment of this application. An embodiment of this application provides a data synchronization method. As shown in FIG. 2, the data synchronization method provided in this application may include the following operations:

Operation 201: A data synchronization process sends first data to a secondary server, where the first data is generated by a first process.

In this embodiment of this application, the first process is configured to perform a first operation on a database, and the first data includes an operation record corresponding to the first operation. In an embodiment, the first process is a transaction process, and the first data may be but is not limited to a transaction log for dealing with crash recovery (database transaction log for dealing with crash recovery, XLOG). The secondary server may obtain, based on the data, an operation performed by a transaction process of the primary server, and perform a same operation, to synchronize data of the primary server on the secondary server.

In this embodiment of this application, a second process may be configured to: perform a second operation on the database, and generate a second log including an operation record corresponding to the second operation. The second process and the first process may be transaction processes in the primary server. The primary server may have one or more transaction processes. When the primary server receives an operation instruction sent by a user to perform a transaction such as a read/write operation, the primary server may generate a corresponding transaction process, where the transaction process includes an operation corresponding to the operation instruction sent by the user, the transaction process may perform a corresponding operation on a storage device in the database, and the operation may include adding data, deleting data, modifying data, querying data, and the like. This is not limited in this application. After the transaction process completes a corresponding operation, the transaction process may generate data including an operation record corresponding to the operation. The secondary server may perform a same operation on the storage device as the primary server based on the data. In an embodiment, the log may be, but is not limited to, the transaction log for dealing with crash recovery (database transaction log for dealing with crash recovery, XLOG). The secondary server may obtain, based on the log, an operation performed by a transaction process of the primary server, and perform a same operation, to back up data of the primary server on the secondary server.

Optionally, in this embodiment of this application, the first process and the second process may be transaction processes. The second process is configured to: perform a second operation on a database (a storage device, a memory, or the like in a database system), and generate second data including an operation record corresponding to the second operation. The second process is configured to perform the second operation on the database, and the second data includes the operation record corresponding to the second operation. The first process is configured to: perform a first operation on the database, and generate first data including an operation record corresponding to the first operation. The second process and the first process may be different transaction processes on the primary server, and are respectively generated in response to different user operation instructions.

After the transaction process generates the data, the transaction process may store the data in a cache, and a data writing process writes the data from the cache to a corresponding file. The data writing process may be a transaction process that obtains a lock through contention, or a separate process specially used for writing data. This is not limited herein.

In this embodiment of this application, after the second process generates the second data including the operation record corresponding to the second operation, the data writing process may write the second data into a corresponding file. After the first process generates the first data including the operation record corresponding to the first operation, the data writing process may write the first data into a corresponding file. The data writing process may be the second process, the first process, another transaction process, or another process specially used for writing data.

After the transaction process generates the data, the transaction process may add the data to a specific waiting queue. The transaction process may sort the data in the waiting queue based on a number LSN (LOG sequence number) of a data sequence in which the data is located, and sequentially add the data to corresponding queue elements. Referring to FIG. 3, for example, it is assumed that four transaction processes are added to the waiting queue, the four transaction processes are respectively denoted as T1 to T4, and data locations LSNs of data T1 to T4 are sequentially identified as 10 to 40. As shown in FIG. 3, when the transaction processes T1 to T4 are added to the waiting queue, the transaction processes T1 to T4 may be sorted according to the LSN, and are sequentially added to the waiting queue.

In this embodiment of this application, after the second process and the first process generate the data, the second process and the first process may add an identifier of the second process and an identifier of the first process to the waiting queue. In many embodiments, after the second process generates the second data, the second process may add the identifier corresponding to the second process to the waiting queue. After the first process generates the first data, the first process may add the identifier corresponding to the first process to the waiting queue. It should be noted that the identifier of the first process may uniquely indicate the first process, and the identifier of the second process may uniquely indicate the second process. The identifier may be a pointer of a process or another character string. This is not limited in this application.

The identifier of the second process is located in a third element in the waiting queue, the identifier of the first process is located in a fourth element in the waiting queue, and the fourth element follows the third element. The waiting queue may include a plurality of concatenated elements. A next pointer of a head element points to an adjacent element. The rest can be deduced by analogy. A next pointer of each element points to an adjacent element in the queue until a tail element. In an embodiment, a next pointer of the tail element may point to null (NULL), and if the waiting queue is a bidirectional loopback queue, some other operations may be conveniently supported. For example, when a transaction process needs to be temporarily canceled, the tail element may also point to another queue element. In this embodiment of this application, the fourth element follows the third element, that is, there is a next pointer path in the waiting queue, and the next pointer path may point from the third element to the fourth element.

In many embodiments, the waiting queue may include a plurality of elements, each element may include an identifier of one process, the identifier of the second process is located in an element other than a head element in the waiting queue, and the fourth element is adjacent to the third element, that is, a next pointer of the third element points to the fourth element. Referring to FIG. 4a, the identifier of the second process is located in an element (the third element) other than a head element in the waiting queue, and the identifier of the first process is located in an element (the fourth element) adjacent to the third element. The identifier of the first process may also be located in a tail element of the waiting queue.

Figure 4B:
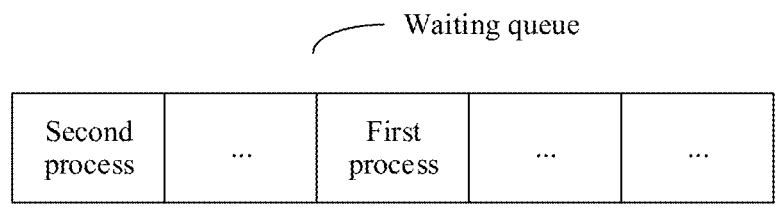
FIG. 4*b* is a schematic diagram of a structure of a waiting queue.

In various embodiments, the waiting queue may include a plurality of elements, each element may include an identifier of one process, the identifier of the second process is located in a head element of the waiting queue, and the identifier of the first process is located in an element other than the head element in the waiting queue. It should be noted that the head element herein refers to a head (head) in the queue. Referring to FIG. 4b, or example, the identifier of the second process is located in a head element of the waiting queue, the identifier of the first process is located in an element other than the head element in the waiting queue, another element may exist between the element in which an identifier of the second process is located and an element in which the identifier of the first process is located, and the identifier of the first process may also be located in a tail element of the waiting queue.

Figure 4C:
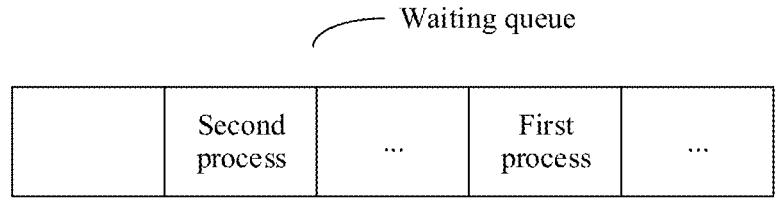
FIG. 4*c* is a schematic diagram of a structure of a waiting queue.

Referring to FIG. 4c, in some embodiments, the waiting queue may include a plurality of elements, each element may include an identifier of one process, and the identifier of the second process is located in an element other than a head element in the waiting queue, the identifier of the first process is located in an element other than the head element in the waiting queue, and the fourth element is not adjacent to the third element, that is, an element including an identifier of another process exists between the fourth element and the third element.

In this embodiment of this application, after the transaction process generates the data, in addition to being added to the waiting queue, the transaction process may further send a data synchronization request to a data synchronization process of the primary server, to indicate the data synchronization process to trigger the secondary server to perform data synchronization. After the data synchronization process receives the synchronization request, if the data synchronization process is in an idle state, the data synchronization process may send, to the secondary server, data that currently needs to be synchronized, and a data synchronization process of the secondary server may receive the data and write the data into a corresponding file system of the secondary server. After data writing is completed (that is, data synchronization is completed), the data synchronization process of the secondary server may feed back synchronization progress to the primary server, to indicate which data is synchronized.

In this embodiment of this application, the data synchronization process may be the foregoing data synchronization process. After the data synchronization process receives the data synchronization request, if the data synchronization process is in the idle state, the data synchronization process may send, to the secondary server, data (e.g., the first data and the second data) that currently needs to be synchronized, and the data synchronization process of the secondary server may receive the first data and the second data, and write the first data and the second data into the corresponding file system of the secondary server. After the first data and the second data are written (that is, synchronization of the first data and the second data is completed), the data synchronization process of the secondary server may feed back synchronization progress to the data synchronization process of the primary server, to indicate that the first data and the second data are synchronized.

Operation 202: The data synchronization process wakes a second process based on completion of synchronization of the first data by the secondary server.

After the data synchronization process receives the synchronization progress sent by the secondary server, the data synchronization process may wake up the second process. The data synchronization process may traverse a waiting queue, separate a transaction process that has completed data synchronization from the waiting queue based on completion progress, and generate a completion queue. The completion queue may be temporarily generated, and after all transaction processes in the completion queue are woken up, the completion queue may no longer exist. It should be noted that, if the data synchronization process runs fast enough, a same waiting queue may be separated into a plurality of completion queues in sequence, and the plurality of completion queues coexist.

In this embodiment of this application, the data synchronization process triggers the secondary server to synchronize the second data and the first data, and generates the completion queue based on at least the second process and completion of synchronization of the first data and the second data by the secondary server. The identifier of the second process is located in the first element of the completion queue, and the data synchronization process may wake up a process corresponding to the identifier included in the first element.

The following describes how the data synchronization process generates the completion queue based on at least the second process.

In this embodiment of this application, the completion queue is generated based on at least the second process and the first process, the identifier of the first process is located in a second element of the completion queue, and the second element follows the first element in the completion queue.

In this embodiment of this application, the completion queue may be generated by the data synchronization process based on the waiting queue. In an optional embodiment, the completion queue is all or a part of the waiting queue. If logs corresponding to only some processes in the waiting queue are backed up on the secondary server, a next pointer of an element in which a process at a tail of the waiting queue is located may be changed from originally pointing to an adjacent process to point to null (NULL). In this case, in the foregoing some processes, the element in which the process at the tail of the waiting queue is located becomes a tail element.

In this embodiment of this application, relative locations of the third element and the fourth element in the waiting queue are the same as relative locations of the first element and the second element in the completion queue. That is, an interval and a sequence between the element in which the second process is located and the element in which the first process is located remain unchanged.

Figure 5A:
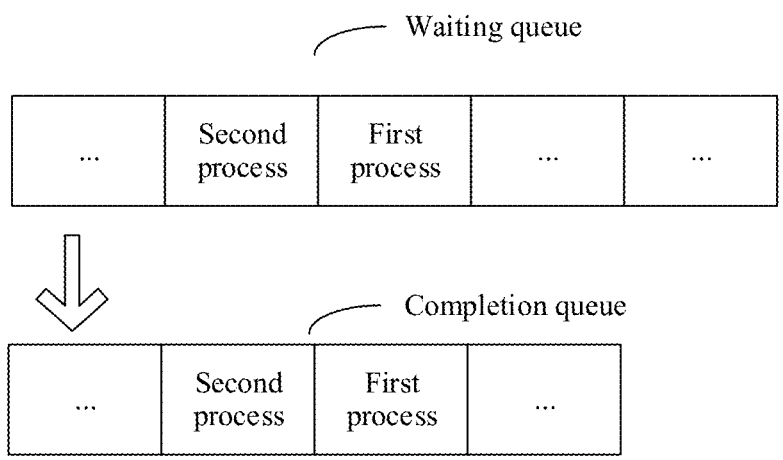
FIG. 5*a* is a schematic diagram of a structure of a waiting queue and a completion queue.

Referring to FIG. 5a, the identifier of the second process is located in an element (the third element) other than a head element in the waiting queue, and the identifier of the first process is located in an element (the fourth element) adjacent to the third element. The identifier of the first process may also be located in a tail element of the waiting queue, that is, a next pointer of an element in which the first process is located points to null (NULL). Correspondingly, the completion queue is a part of the waiting queue. In the waiting queue, the third element is adjacent to the fourth element, and the fourth element follows the third element. Correspondingly, in the completion queue, the third element is adjacent to the fourth element, and the fourth element follows the third element.

Figure 5B:
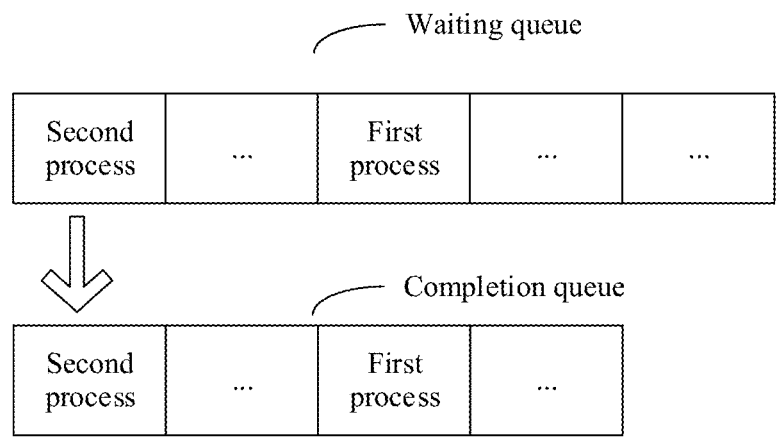
FIG. 5*b* is a schematic diagram of a structure of a waiting queue and a completion queue.

Referring to FIG. 5b, the identifier of the second process is located in a head element of the waiting queue, the identifier of the first process is located in an element other than the head element in the waiting queue, and another element may exist between an element in which the second process is located and an element in which the first process is located. Alternatively, the first process may be located in a tail element of the waiting queue, that is, a next pointer of the element in which the first process is located points to null (NULL). Correspondingly, the completion queue is a part of the waiting queue. In the waiting queue, the third element is a head element, the third element and the fourth element are separated by N elements, and the fourth element follows the third element. Correspondingly, in the completion queue, the third element is a head element, the third element and the fourth element are separated by N elements, and the fourth element follows the third element.

Figure 5C:
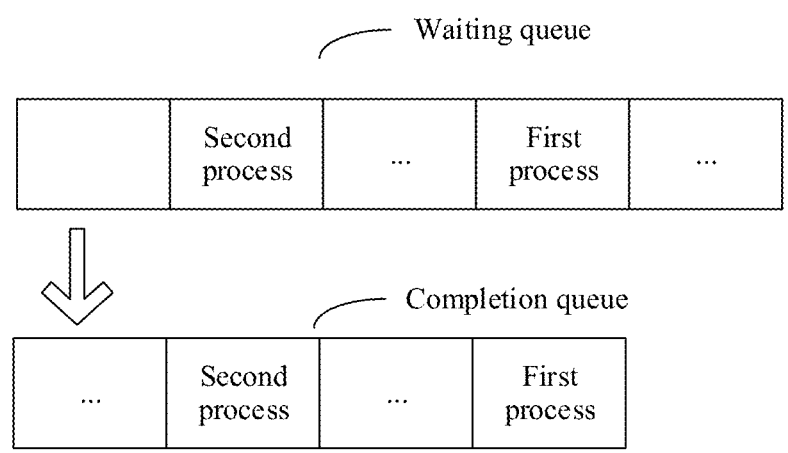
FIG. 5*c* is a schematic diagram of a structure of a waiting queue and a completion queue.

Referring to FIG. 5c, the identifier of the second process is located in an element other than a head element in the waiting queue, the identifier of the first process is located in an element other than the head element in the waiting queue, and the fourth element is not adjacent to the third element, that is, an element including an identifier of another process exists between the fourth element and the third element. Correspondingly, the completion queue is a part of the waiting queue. In the waiting queue, the third element and the fourth element are separated by N elements, and the fourth element follows the third element. Correspondingly, in the completion queue, the third element and the fourth element are separated by N elements, and the fourth element follows the third element.

In this embodiment of this application, the data synchronization process may wake up the second process in the completion queue, that is, the data synchronization process may wake up a process corresponding to the identifier included in the first element in the completion queue, and the first element includes the identifier of the second process.

In an optional embodiment, if the identifier of the second process is located in a head element of the completion queue, the data synchronization process may wake up a process corresponding to an identifier included in the head element of the completion queue.

In an optional embodiment, if the identifier of the second process is located in an element other than a head element in the completion queue, the data synchronization process may wake up a process included in the head element and processes corresponding to identifiers included in sequentially adjacent elements until the second process is woken up.

Operation 203: The second process wakes up the first process.

In this embodiment of this application, after the second process is woken up, the second process may wake up the first process.

In some embodiments, the second process wakes up processes included in one or more elements that are in the completion queue and that follow the first element. In this embodiment of this application, the second process instead of the data synchronization process may wake up another process in the completion queue. The second process needs to detect whether a subsequent element of the completion queue includes another transaction process, and if the subsequent element of the completion queue includes the other transaction process, the second process is responsible for waking up a remaining transaction process in the completion queue.

Figure 6A:
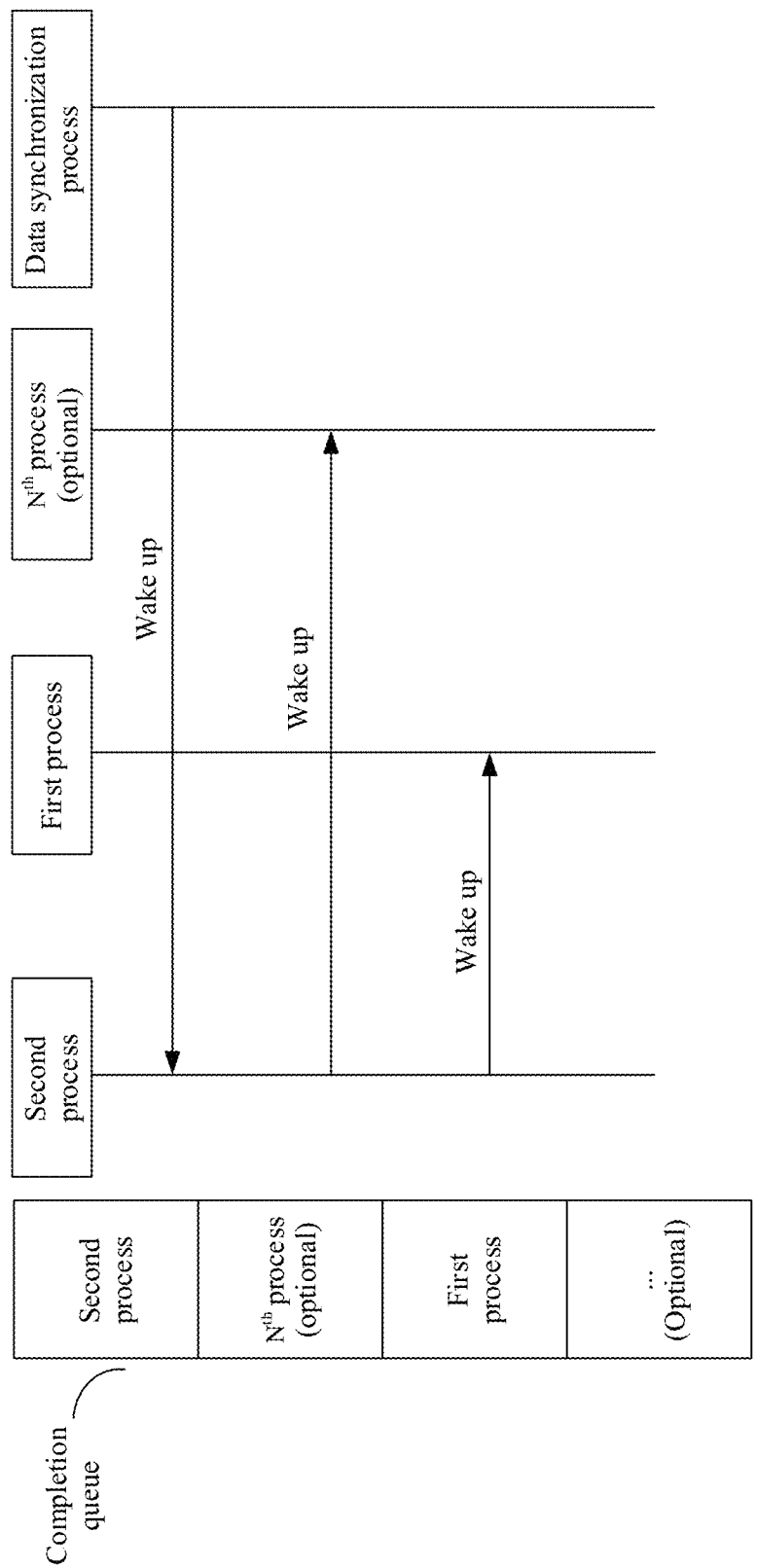
FIG. 6*a* is a schematic diagram of a process processing procedure.

In various embodiments, the identifier of the second process is located in a head element of the completion queue. Referring to FIG. 6a, after the data synchronization process wakes up the second process, the second process may wake up an $N^{th}$ process (the $N^{th}$ process may exist or may not exist, and when the $N^{th}$ process does not exist, an element in which the second process is located is adjacent to an element in which the first process is located, and a quantity of the $N^{th}$ process is not limited, that is, one or more elements may exist between the element in which the second process is located and the element in which the first process is located). After the $N^{th}$ process is woken up, the first process may be woken up, and a process that follows the first process is woken up (e.g., if the identifier of the first process is located at a tail element of the completion queue, an operation of waking up the process that follows the first process does not need to be performed).

Figure 6B:
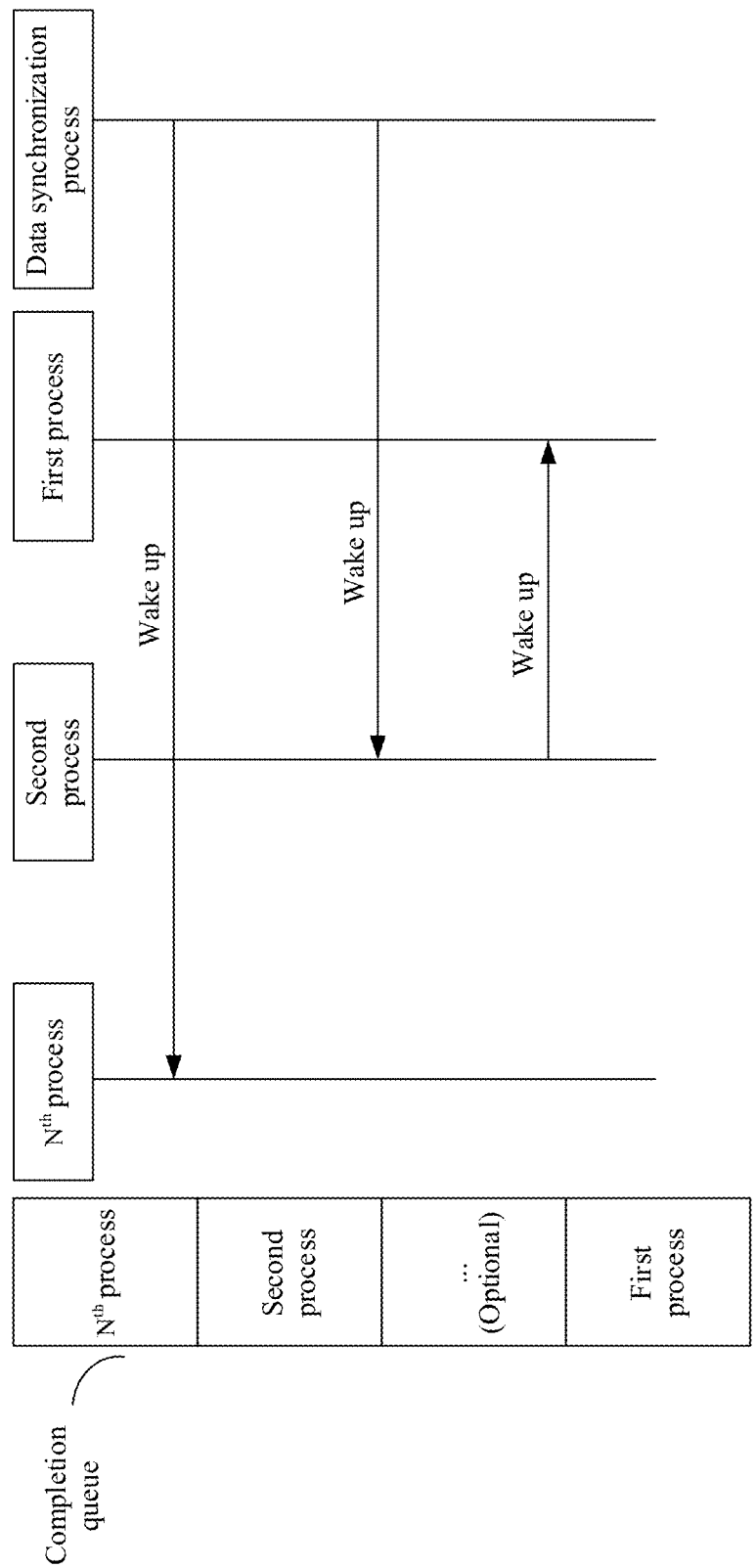
FIG. 6*b* is a schematic diagram of a process processing procedure.

In an optional embodiment, the identifier of the second process is located in an element other than a head element in the completion queue. Referring to FIG. 6b, the data synchronization process needs to first wake up an $N^{th}$ process (a quantity of the $N^{th}$ process is not limited, that is, one or more elements may exist before an element in which the second process is located). Then, the data synchronization process may wake up the second process, and the second process may wake up the first process, and wake up a process that follows the first process (if the identifier of the first process is located at a tail element of the completion queue, an operation of waking up the process that follows the first process does not need to be performed).

In some embodiments, the second element is adjacent to the first element, and the second process wakes up a process corresponding to an identifier included in an element that is in the completion queue and that is adjacent to the first element and that follows the first element.

Figure 6C:
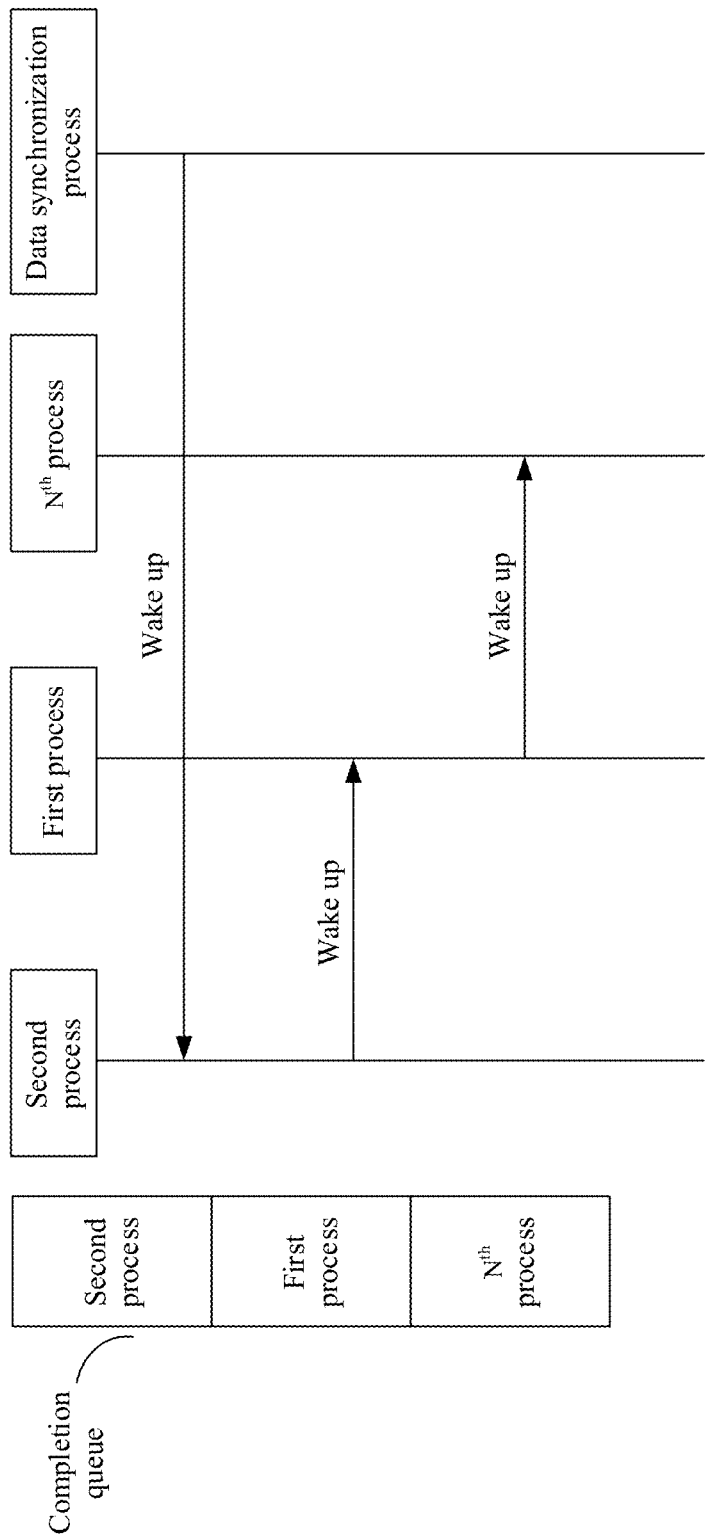
FIG. 6*c* is a schematic diagram of a process processing procedure.

In various embodiments, the identifier of the second process is located in a head element of the completion queue. Referring to FIG. 6c, after the data synchronization process wakes up the second process, the second process may wake up the first process included in an adjacent element, and then the first process may wake up an $N^{th}$ process adjacent to the first process. The rest may be deduced by analogy until a transaction process included in a tail element is woken up.

Figure 6D:
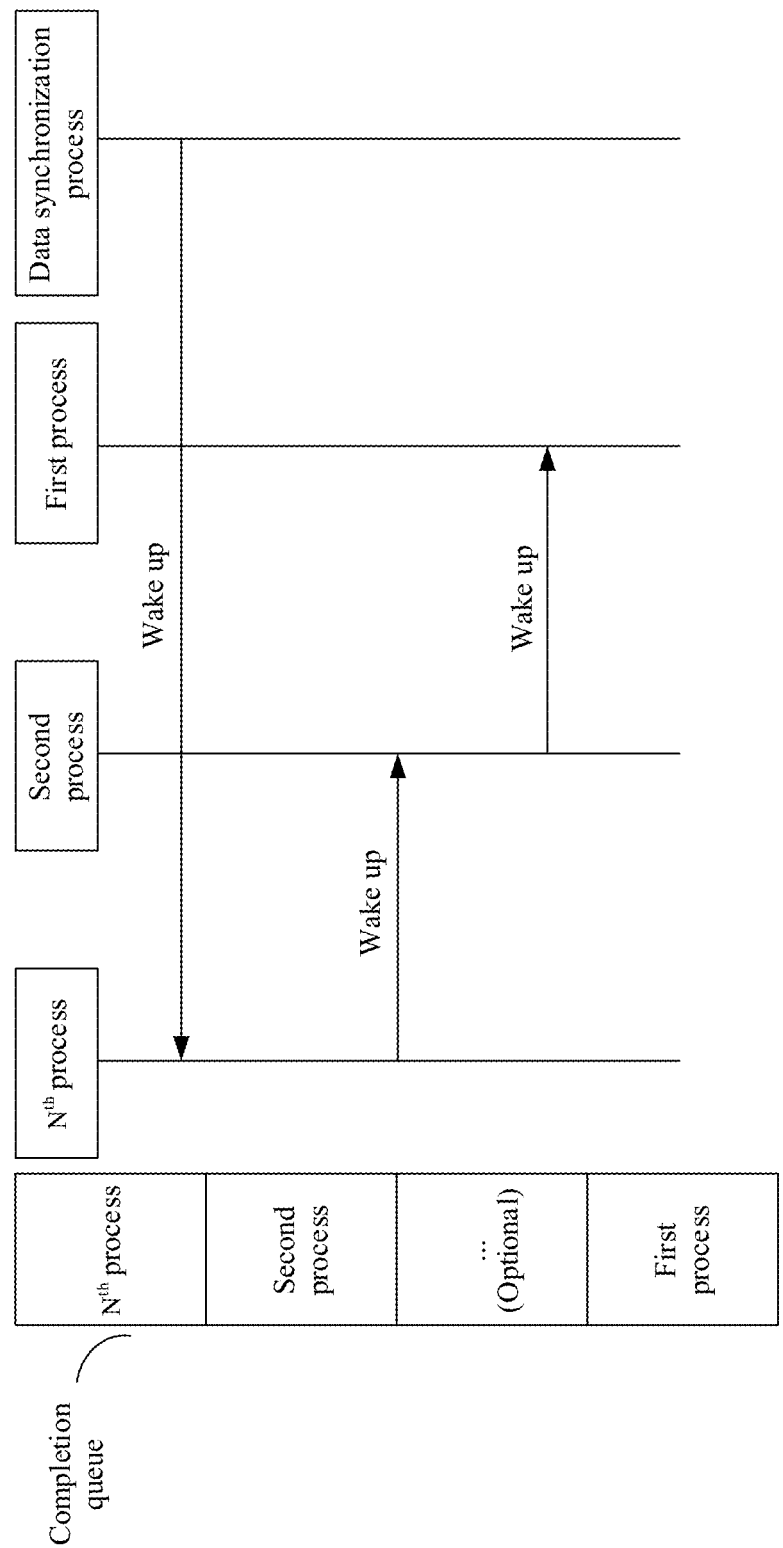
FIG. 6*d* is a schematic diagram of a process processing procedure.

In many embodiments, the identifier of the second process is located in an element other than a head element in the completion queue. Referring to FIG. 6*d*, the data synchronization process needs to first wake up an $N^{th}$ process (a quantity of the $N^{th}$ process is not limited, that is, one or more elements may exist before an element in which the second process is located). Then, the $N^{th}$ process may wake up the second process, and further, the second process may wake up the first process. The rest may be deduced until a transaction process included in a tail element is woken up.

In this embodiment of this application, if the identifier of the second process is located in an element (not a tail element) other than a head element in the completion queue, wake-up of a subsequent process of the second process is not performed by the data synchronization process (which may be performed by the second process or a subsequent process of the second process). In this way, the data synchronization process only needs to wake up some processes that have completed data synchronization, and the data synchronization process can be more focused on triggering the secondary server to perform data synchronization and receiving synchronization progress of the secondary server. Therefore, load of the data synchronization process is relieved, and time for the data synchronization process to wake up a transaction process is reduced.

If the identifier of the second process is located in a head element of the completion queue, and wake-up of subsequent processes is not performed by the data synchronization process (which may be performed by the second process or a subsequent process of the second process), the data synchronization process needs to wake up only one process (e.g., the second process). This relieves load of the data synchronization process and reduces time for the data synchronization process to wake up a transaction process.

Figure 7:
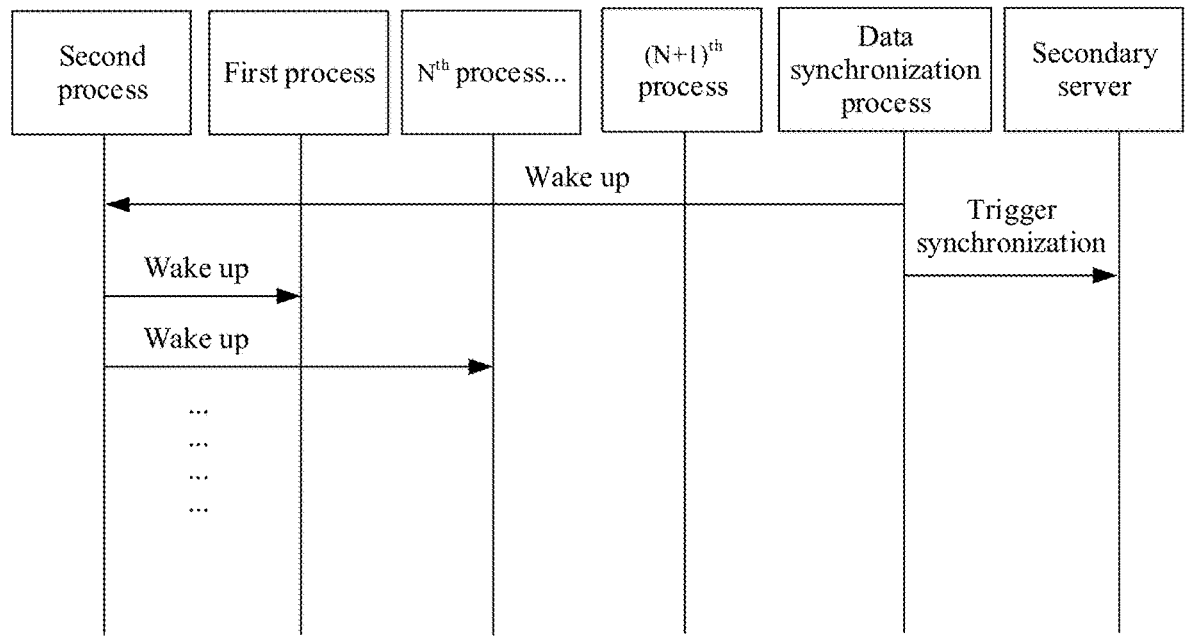
FIG. 7 is a schematic diagram of a process processing procedure.
Figure 8:
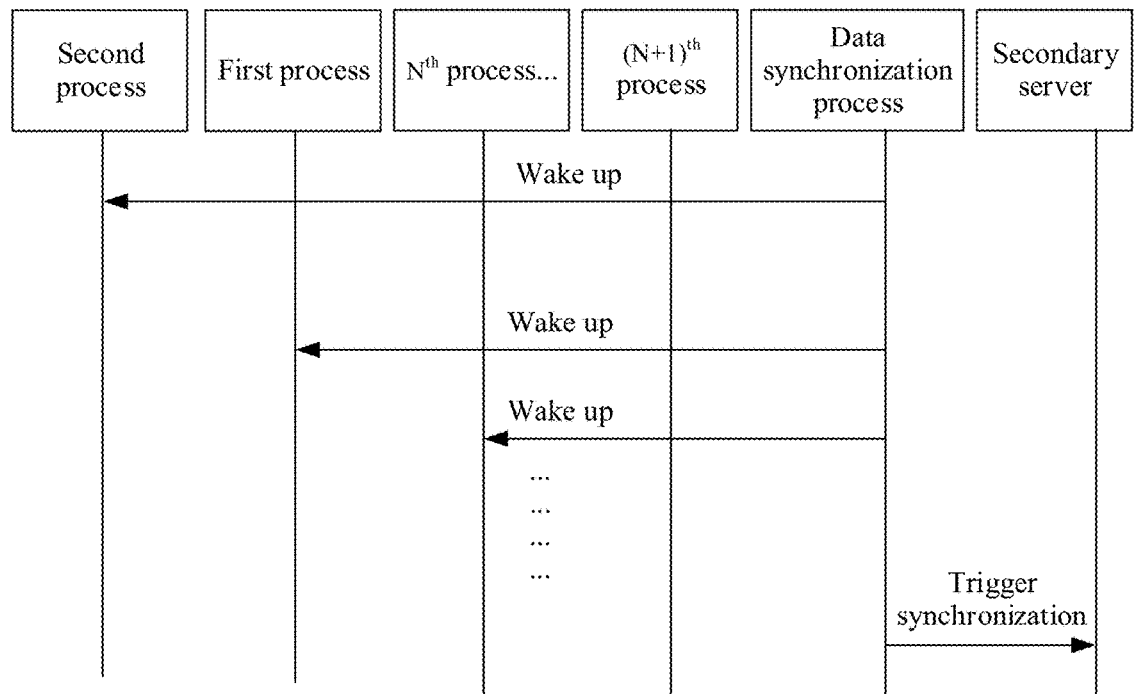
FIG. 8 is a schematic diagram of a process processing procedure.

Referring to FIG. 7, in some embodiments, after the data synchronization process wakes up the second process, the data synchronization process may trigger the secondary server to perform data synchronization, and remaining transaction processes may be woken up by the second process. Referring to FIG. 8, in a conventional implementation, after the data synchronization process wakes up the second process, the data synchronization process further needs to wake up remaining transaction processes, and the secondary server can be triggered to perform data synchronization only after the remaining transaction processes are woken up. In this case, there may be a large quantity of transaction processes waiting to be woken up in the waiting queue. As a result, process wake-up efficiency of the data synchronization process is poor.

In this embodiment of this application, the data synchronization process does not need to wake up all processes that have completed data synchronization, but only needs to wake up some processes that have completed data synchronization. In this way, the data synchronization process can be more focused on triggering the secondary server to perform data synchronization and receiving synchronization progress of the secondary server. Therefore, load of the data synchronization process is relieved, and time for the data synchronization process to wake up a transaction process is reduced.

In an embodiment, the second process may not be a transaction process, but a process independently used to wake up a transaction process. The first process is a process corresponding to an identifier included in any element in the waiting queue (waiting queue). In this embodiment of this application, the completion queue is generated based on at least the first process, the identifier of the first process is located in a first element of the completion queue, and the second process wakes up a process corresponding to the identifier included in the first element.

In this embodiment of this application, the completion queue may be generated based on at least the first process, where the identifier of the first process is located in the first element of the completion queue. The primary server includes a waiting queue, and the method further includes: adding the first process to the waiting queue before the secondary server completes the synchronization, where the completion queue is generated based on the waiting queue. Optionally, the completion queue may be all or a part of the waiting queue.

Figure 9:
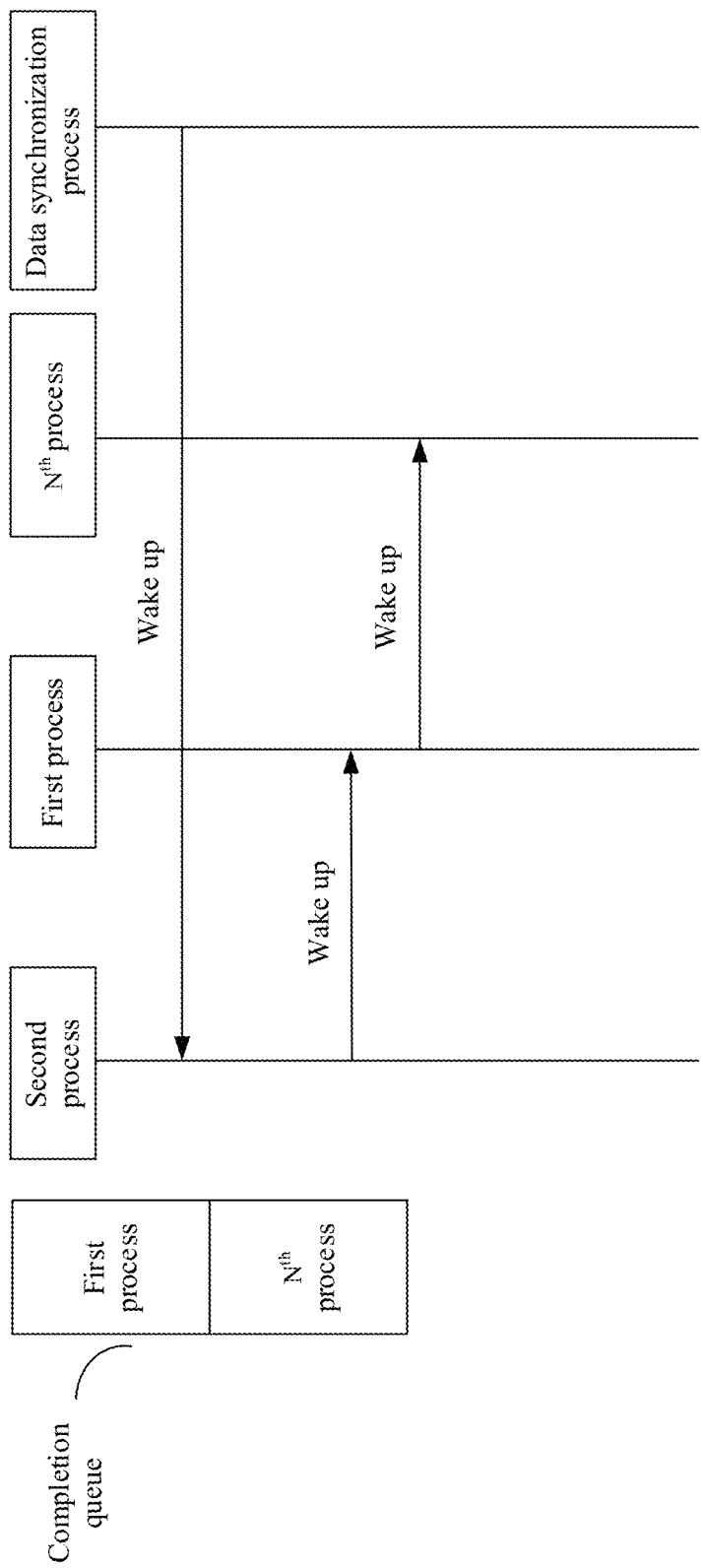
FIG. 9 is a schematic diagram of a process processing procedure.

Referring to FIG. 9, it should be noted that the second process may wake up transaction processes included in all elements in the completion queue. Alternatively, when the identifier of the first process is located in a head element of the completion queue, the second process may wake up the first process, and the first process wakes up transaction processes included in remaining elements in the completion queue.

Figure 10:
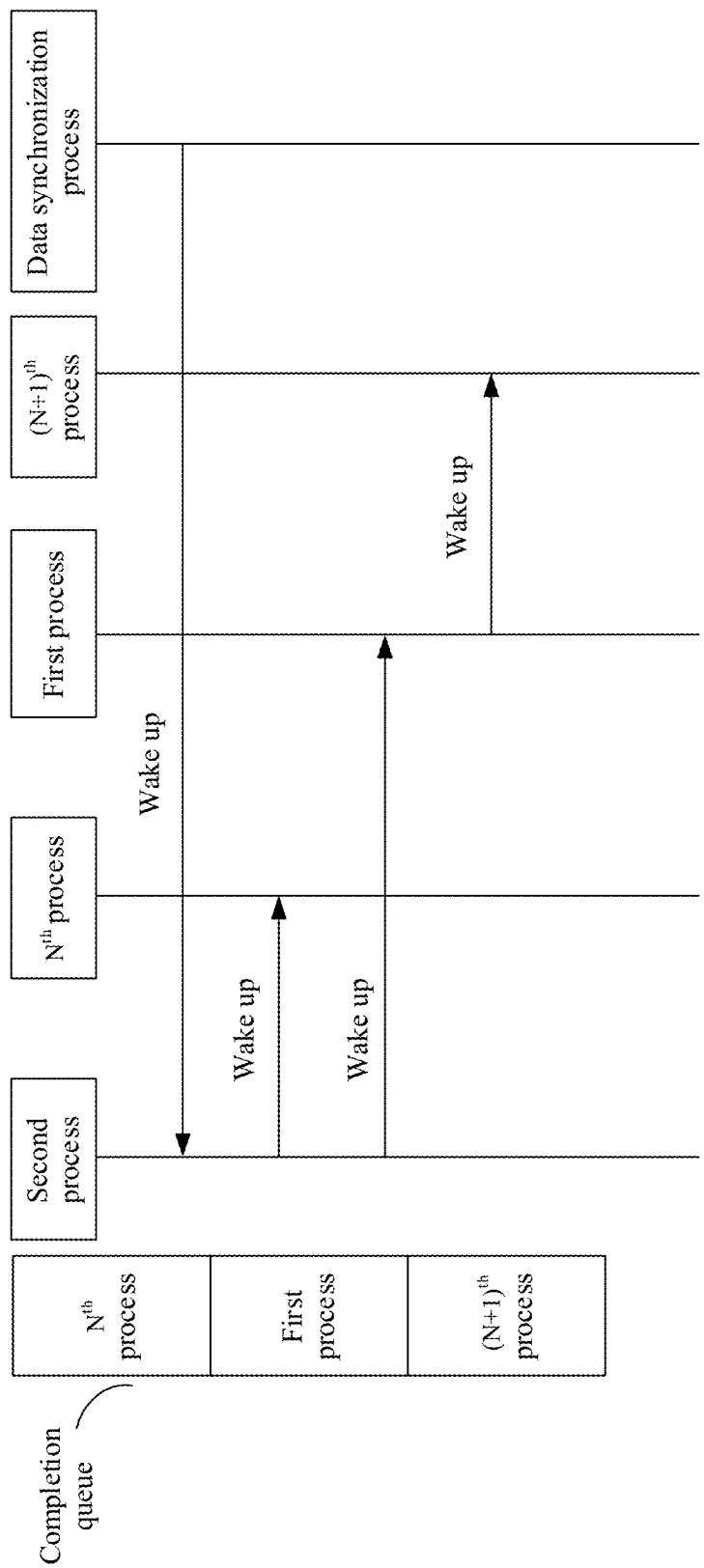
FIG. 10 is a schematic diagram of a process processing procedure.

Referring to FIG. 10, alternatively, the second process may wake up a process corresponding to an identifier included in an element before an element in which the first process is located until the first process is woken up, and the first process wakes up transaction processes included in remaining elements in the completion queue.

Figure 11:
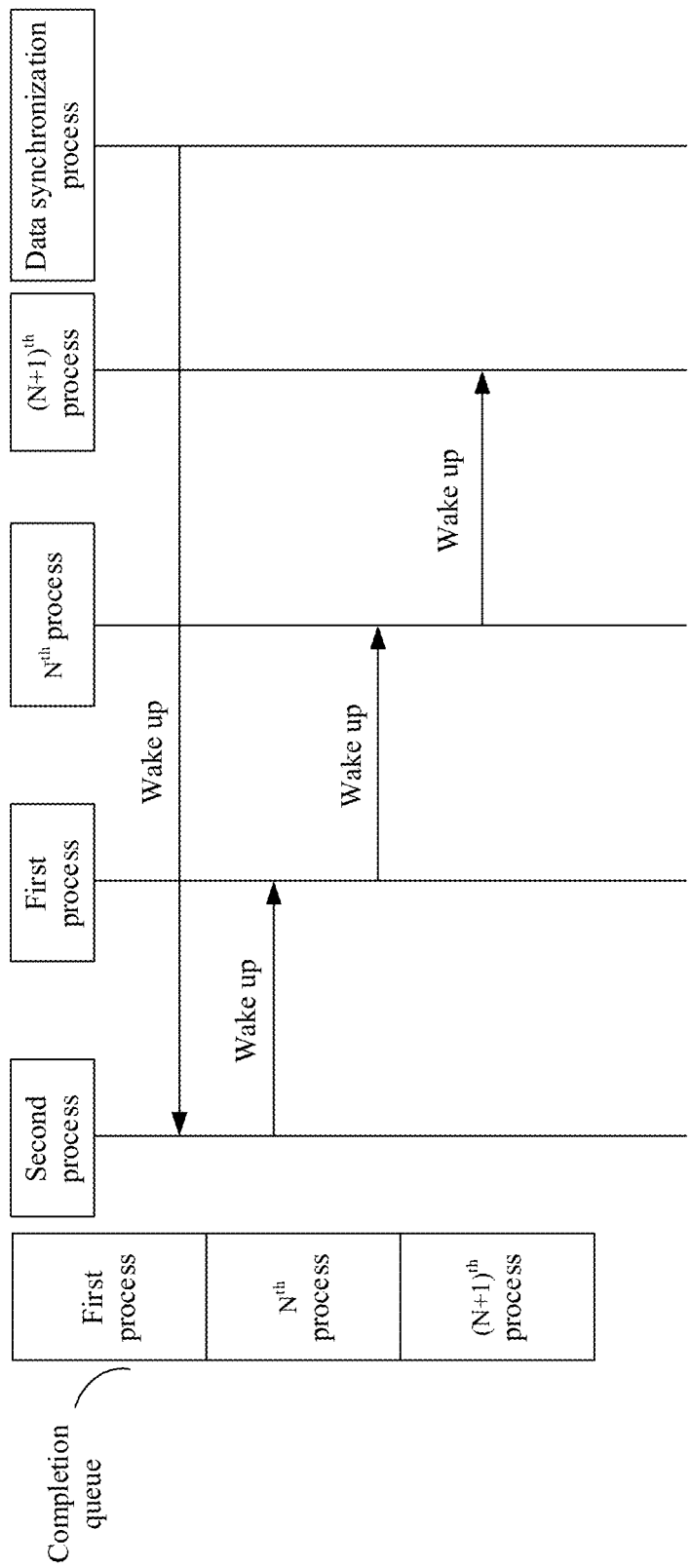
FIG. 11 is a schematic diagram of a process processing procedure.

Referring to FIG. 11, alternatively, when the identifier of the first process is located in a head element of the completion queue, the second process may wake up the first process, the first process wakes up a process corresponding to an identifier included in an adjacent and subsequent element, and then a process that is corresponding to the identifier included in the adjacent and subsequent element and that is woken up wakes up transaction processes included in remaining elements in the completion queue. Alternatively, when the identifier of the first process is located in a head element of the completion queue, the second process may wake up the first process, the first process wakes up a process corresponding to an identifier included in an adjacent and subsequent element, and then a process that is corresponding to the identifier included in the adjacent and subsequent element and that is woken up wakes up a process corresponding to an identifier included in an adjacent element. The rest can be deduced by analogy until all transaction processes included in elements in the completion queue are woken up.

In this embodiment of this application, the data synchronization process does not need to wake up a process that has completed data synchronization, but only needs to wake up a process specially used for waking up a process that has completed data synchronization. In this way, the data synchronization process can be more focused on triggering the secondary server to perform data synchronization and receiving synchronization progress of the secondary server. Therefore, load of the data synchronization process is relieved, and time for the data synchronization process to wake up a transaction process is reduced.

Optionally, in this embodiment of this application, the primary server includes a plurality of NUMA nodes, and the second process and the first process belong to a process included in a same NUMA node. Data related to the second process and data related to the first process occupy a memory resource in a same NUMA node.

Optionally, in this embodiment of this application, the primary server includes a plurality of NUMA nodes, and the completion queue and at least one of the second process and the first process belong to a same NUMA node. Data related to the at least one of the second process and the first process, and data related to the completion queue occupy a memory resource in the same NUMA node.

Optionally, in this embodiment of this application, the primary server includes a plurality of NUMA nodes, and the waiting queue and at least one of the second process and the first process belong to a same NUMA node. Data related to the at least one of the second process and the first process, and data related to the waiting queue occupy a memory resource in the same NUMA node.

Optionally, in this embodiment of this application, the completion queue and the waiting queue belong to a same NUMA node. Data related to the second process and data related to the first process occupy a memory resource in a same NUMA node. Data related to the completion queue and data related to the waiting queue occupy a memory resource in the same NUMA node.

In this embodiment of this application, when the database system is initialized, a corresponding waiting queue may be allocated to each NUMA node, and transaction processes (e.g., the second process and the first process) may be allocated to a waiting queue of the node. Similarly, a completion queue separated from the waiting queue is also located on this node. Based on this, when the completion queue traverses and wakes up the transaction processes, a process and accessed data are located on a same NUMA node. This avoids remote memory access with high costs, and further improves efficiency of a parallel wake-up mechanism.

Figure 12:
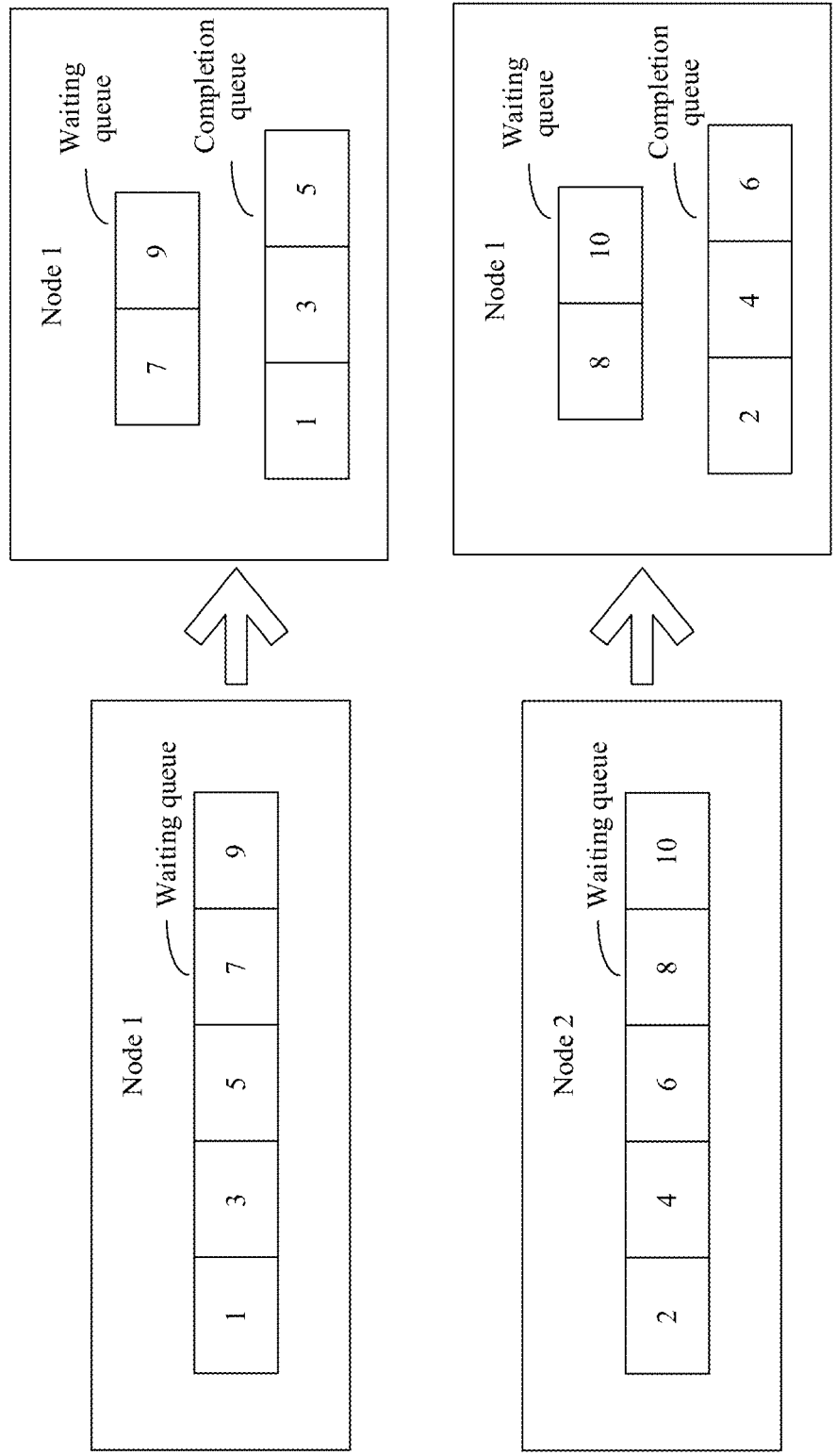
FIG. 12 is a schematic diagram of a process processing procedure.
Figure 13:
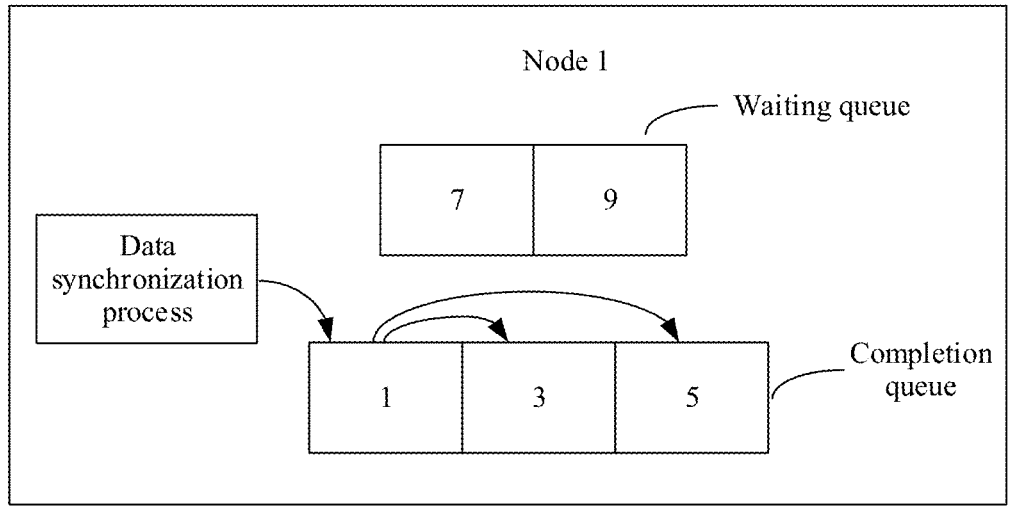
FIG. 13 is a schematic diagram of a process processing procedure.
Figure 13:
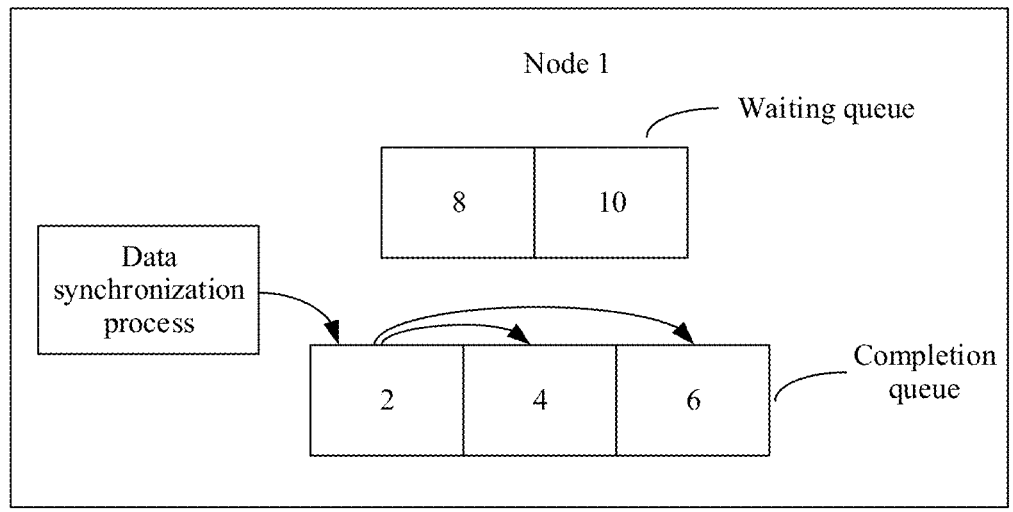

Referring to FIG. 12 and FIG. 13, the following describes an application example of this application. In this example, there are two NUMA nodes (a node 1 and a node 2) in a NUMA system.

During system initialization, two waiting queues need to be prepared for a data synchronization process, and the two waiting queue respectively belong to the node 1 and the node 2. When a transaction process is started, the transaction process can be bound to different NUMA nodes based on an even distribution policy. It is assumed that an odd-numbered process is bound to the node 1, and an even-numbered process is bound to the node 2.

After the transaction process is ready to commit and completes writing of a local log file, the transaction process sends a request to the data synchronization process and adds the request to a corresponding waiting queue. For example, processes numbered 1, 3, 5, 7, and 9 are added to a waiting queue on the node 1, and processes numbered 2, 4, 6, 8, and 10 are added to a waiting queue on the node 2.

A data synchronization process of a primary server sends a log to a secondary server, and receives a log processing progress message from the secondary server. When the data synchronization process of the primary server detects that synchronization progress of the secondary server is updated, the data synchronization process of the primary server is ready to wake up related transaction processes. During wake-up, each waiting queue is traversed, and a queue is disconnected based on synchronization completion location information, that is, a transaction queue that has completed synchronization is separated. In this operation, a lock needs to be held to protect the waiting queue.

As shown in FIG. 12, transaction processes numbered 1, 3, and 5 and transaction processes numbered 2, 4, and 6 are separated to different completion queues (completion queue). The data synchronization process can wake up a first transaction process of each completion queue, and is not responsible for waking up other processes. As shown in FIG. 13, only processes numbered 1 and 2 are woken up. Then, the data synchronization process immediately enters a next round of work and does not wake up remaining processes. Each process (the processes numbered 1 and 2) corresponding to a head element of the queue is responsible for waking up processes in the queue. Wake-up operations of the process numbered 1 and 2 are concurrently executed.

Figure 14:
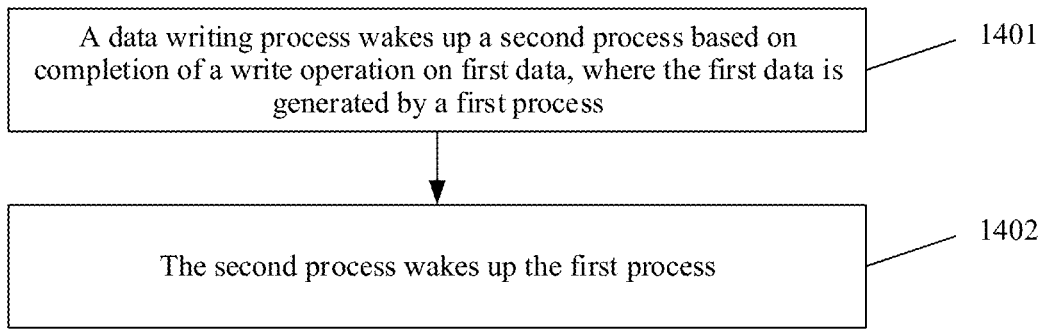
FIG. 14 is a schematic diagram of a process processing procedure.

FIG. 14 is a schematic flowchart of a data writing method according to an embodiment of this application. As shown in FIG. 14, the data writing method provided in this embodiment of this application includes the following operations:

Operation 1401: A data writing process wakes up a second process based on completion of a write operation on first data, where the first data is generated by a first process; and Operation 1402: The second process wakes up the first process.

In this embodiment of this application, the first process is configured to perform a first operation on a database, and the first data includes an operation record corresponding to the first operation.

Different from the embodiments described in FIG. 2 to FIG. 13, this embodiment is applied to a data writing scenario, where the data may be data of a same type as the first data and the second data in the embodiment corresponding to FIG. 2. In some embodiments, it may be an essential processing operation to write data of the database system into a local file. To avoid extra consumption due to contention, a dedicated data service process is used to write data for another transaction process (that is, the data writing process in this embodiment).

In a conventional embodiment, after the data writing process completes the write operation on the first data, the data write process needs to wake up the first process. It takes a long time to wake up a transaction process, and the data writing process can perform a write operation on data corresponding to another transaction process only after the data writing process completes wake-up of the transaction process. Therefore, efficiency is low.

In this embodiment of this application, after the data writing process completes the write operation on the first data, the data writing process may wake up the second process, and then the second process independently wakes up a process, or the second process and other remaining processes in the completion queue jointly wake up a process. For similarities, refer to descriptions of the embodiments in FIG. 2 to FIG. 13. Details are not described herein again.

According to this embodiment of this application, time for a local data writing process to wake up a transaction process is reduced, and efficiency of a file write operation is improved.

In some embodiments, the first process is configured to perform a first operation on a database, and the first data includes an operation record corresponding to the first operation.

In various embodiments, that the data writing process wakes up a second process based on completion of a write operation on first data includes: the data writing process wakes up the second process based on completion of a write operation on the first data and second data, wherein the second data is generated by the second process.

In one or more embodimetns, the second process is configured to perform a second operation on the database, and the second data includes an operation record corresponding to the second operation.

In many embodiments, the primary server includes a completion queue, and an identifier of the second process is located in a first element of the completion queue; and that the second process is woken up includes waking up a process corresponding to the identifier included in the first element.

In several embodimetns, the method further includes, before the second process is woken up, and after the data writing process completes the write operation on the first data, the data writing process generates the completion queue based on at least the identifier of the second process, where the identifier of the second process is located in the first element of the completion queue.

In many embodiments, the first element is a head element of the completion queue.

In some embodiments, an identifier of the first process is located in a second element of the completion queue, and the second element follows the first element in the completion queue; and wherein the second process waking up the first process includes the second process waking up a process corresponding to the identifier included in the second element.

In various embodiments, the second process waking up a process included in the second element includes the second process waking up processes corresponding to identifiers included in a plurality of elements that are in the completion queue and that follow the first element.

In one or more embodiments, the second element is adjacent to the first element; and wherein the second process waking up a process included in the second element includes the second process waking up a process included in an element in the completion queue, wherein the element is adjacent to the first element and follows the first element.

In many embodiments, the primary server includes a waiting queue, before the data writing process completes the write operation on the first data, the identifier of the second process is located in a third element in the waiting queue, the identifier of the first process is located in a fourth element in the waiting queue, and the fourth element follows the third element; and the completion queue is generated based on the waiting queue.

In various embodiments, the completion queue includes one or more parts of the waiting queue.

In several embodiments, relative locations of the third element and the fourth element in the waiting queue are the same as relative locations of the first element and the second element in the completion queue.

In many embodiments, the identifier of the second process is located in a head element of the waiting queue, and the identifier of the first process is located in an element other than the head element in the waiting queue.

In some embodiments, the primary server includes a completion queue, and an identifier of the first process is located in a first element of the completion queue; and the second process is located outside the completion queue; and wherein the second process waking up the first process includes the second process waking up a process corresponding to the identifier included in the first element.

In several embodiments, the method further includes, before the second process wakes up the first process, and after the secondary server completes synchronization of the first data, generating the completion queue based on at least the identifier of the first process, where the identifier of the first process is located in the first element of the completion queue.

In one or more embodiments, the primary server includes a waiting queue, and before the data writing process completes the write operation on the first data, the identifier of the first process is located in a fourth element in the waiting queue; and the completion queue is generated based on the waiting queue.

In many embodiments, the completion queue is all or a part of the waiting queue.

In various embodiments, the first process and the second process run on the primary server, the primary server includes a plurality of NUMA nodes, and the second process and the first process belong to a process included in a same NUMA node.

In some embodiments, the first process and the second process run on the primary server, the primary server includes a plurality of NUMA nodes, and the completion queue and at least one of the second process and the first process belong to a same NUMA node.

In several embodiments, the first process and the second process run on the primary server, the primary server includes a plurality of NUMA nodes, and the waiting queue and at least one of the second process and the first process belong to a same NUMA node; and/or the completion queue and the waiting queue belong to a same NUMA node.

Figure 15:
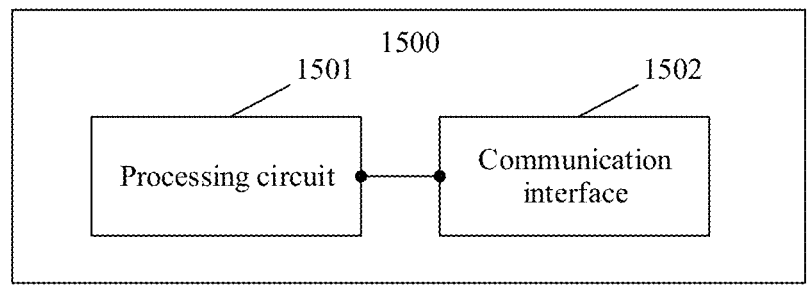
FIG. 15 is a schematic diagram of a structure of a data synchronization apparatus.

Referring to FIG. 15, this application further provides a data synchronization apparatus 1500. The apparatus 1500 includes a processing circuit 1501 and a communication interface 1502.

The processing circuit 1501 is configured to perform an action related to data processing in the embodiments corresponding to FIG. 2 and FIG. 14. The communication interface 1502 is configured to perform a sending action or a receiving action related to interaction with the secondary server in the foregoing embodiments.

Figure 16:
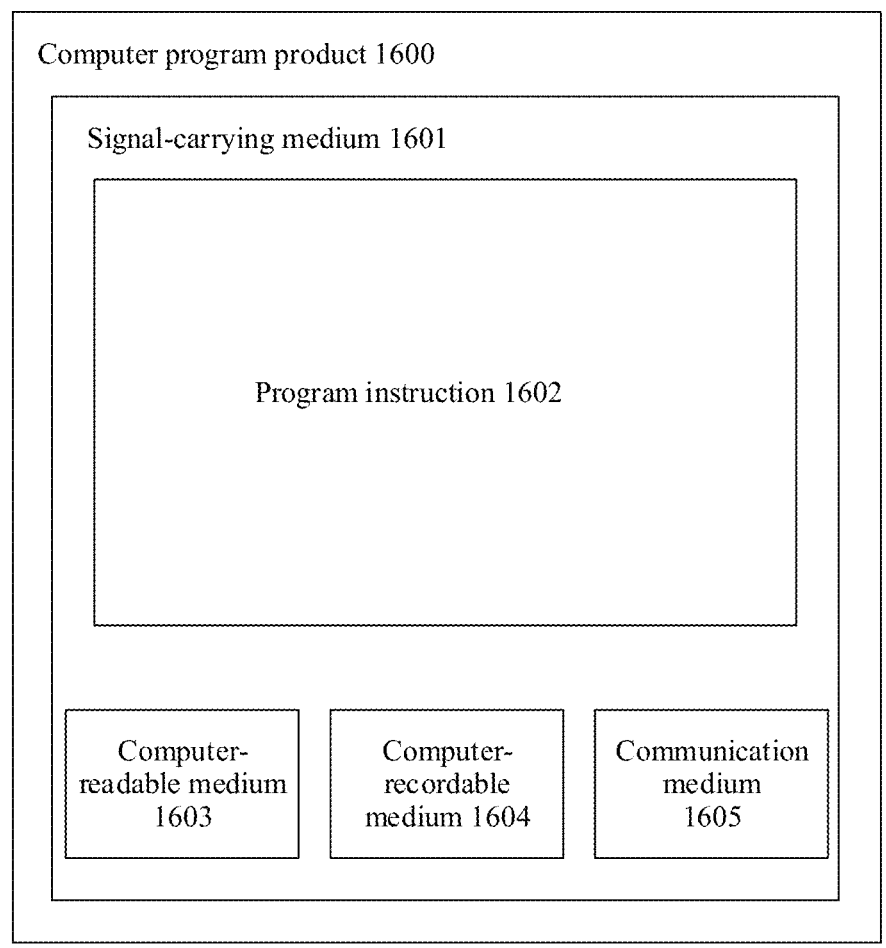
FIG. 16 is a schematic diagram of a structure of a computer program product.

Referring to FIG. 16, this application further provides a computer-readable storage medium. In some embodiments, the methods disclosed in FIG. 2 to FIG. 14 may be implemented as computer program instructions encoded in a machine-readable format on a computer-readable storage medium or encoded on another non-transitory medium or product. FIG. 16 schematically shows a conceptual partial view of an example computer program product arranged according to at least some embodiments shown herein, and the example computer program includes a computer program for executing a computer process on a computing device. In an embodiment, an example computer program product 1600 is provided by using a signal-carrying medium 1601. The signal-carrying medium 1601 may include one or more program instructions 1602. When the program instructions 1602 are run by one or more processors, the program instructions 1602 may provide functions or some functions described in FIG. 2 to FIG. 14. Refer to the embodiment shown in FIG. 2. For example, one or more features of blocks 201 to 203 may be undertaken by one or more instructions associated with the signal-carrying medium 1601. Refer to the embodiment shown in FIG. 14. For another example, one or more features of blocks 1401 and 1402 may be undertaken by one or more instructions associated with the signal-carrying medium 1601. In addition, the program instructions 1602 in FIG. 16 also describe example instructions.

In some examples, the signal-carrying medium 1601 may include a computer-readable medium 1603, such as but not limited to a hard disk drive, a compact disc (CD), a digital video disc (DVD), a digital tape, a memory, and a read-only memory (ROM), or a random access memory (RAM), or the like. In some embodiments, the signal-carrying medium 1601 may include a computer-recordable medium 1604, such as but not limited to a memory, a read/write (R/W) CD, and an R/W DVD. In some embodiments, the signal-carrying medium 1601 may include a communication medium 1605, such as but not limited to a digital and/or analog communication medium (for example, an optical fiber cable, a waveguide, a wired communication link, or a wireless communication link). Therefore, for example, the signal-carrying medium 1601 may be conveyed by a wireless communication medium 1605 (for example, a wireless communication medium that complies with the IEEE 802.11 standard or another transmission protocol). The one or more program instructions 1602 may be, for example, computer-executable instructions or logic implementation instructions. In some examples, a computing device may be configured to provide various operations, functions, or actions in response to the program instructions 1602 transmitted to the computing device by using one or more of the computer-readable medium 1603, the computer-recordable medium 1604, and/or the communication medium 1605. It should be understood that the arrangement described herein is merely used as an example. Therefore, it may be understood by a person skilled in the art that other arrangements and other elements (for example, machines, interfaces, functions, sequences, and groups of functions) can be used instead, and that some elements may be omitted together based on an expected result. In addition, many of the described elements are functional entities that can be implemented as discrete or distributed components, or implemented in any suitable combination at any suitable position in combination with another component.

Figure 17:
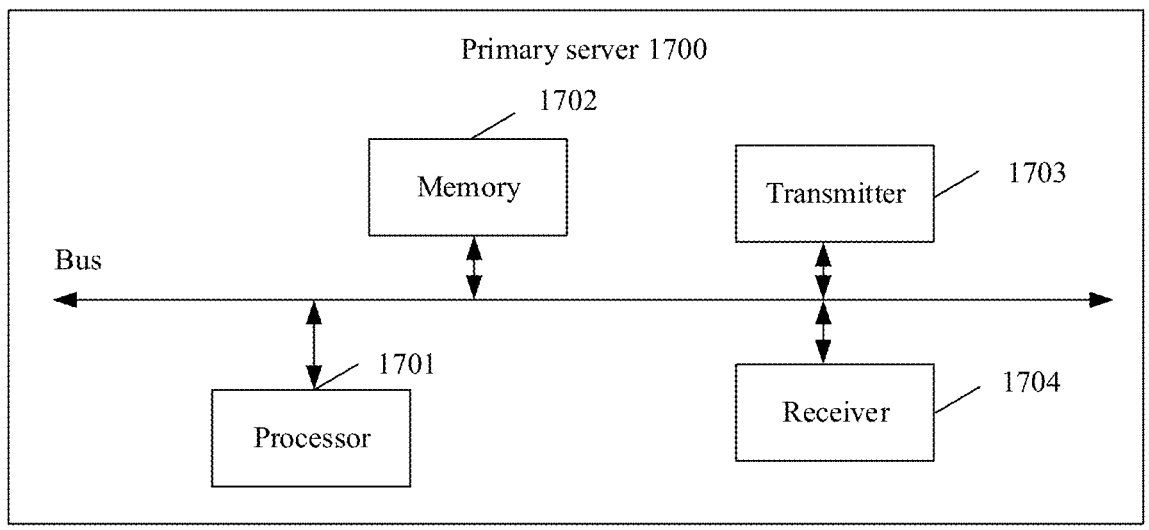
FIG. 17 is a schematic diagram of a structure of a primary server.

Based on a same inventive concept idea, an embodiment of the current disclosure provides a primary server. Referring to FIG. 17, a primary server 1700 includes a transmitter 1703, a receiver 1704, a memory 1702, and a processor 1701 coupled to the memory 1702. The transmitter 1703, the receiver 1704, the memory 1702, and the processor 1701 may be connected through a bus or in another manner (connection through a bus is used as an example in FIG. 17).

The processor 1701 may be one or more central processing units (Central Processing Unit, CPU). In FIG. 17, one processor is used as an example. When the processor 1701 is one CPU, the CPU may be a single-core CPU, or may be a multi-core CPU.

The memory 1702 includes but is not limited to a random access memory (RAM), a read-only memory (ROM), an erasable programmable read-only memory (EPROM), or a portable read-only memory (CD-ROM). The memory 1702 is configured to store related instructions and data, and is further configured to store program code. The program code is used to implement the methods described in the embodiments in FIG. 2 to FIG. 14.

The transmitter 1703 is configured to send data to the outside (for example, secondary server).

The receiver 1704 is configured to receive data from the outside (for example, a secondary server).

It should be noted that, in this embodiment of the present disclosure, the primary server may be an independent device in a database system. For example, the primary server is an independent physical server. Alternatively, the primary server may be a dependent device. In this case, in an application scenario, the primary server may be built in the primary server, or exist as a functional module of the primary server (for example, primary servers are used as different virtual machines, are connected by using an I/O interface, and coexist in a same physical server). In another application scenario, the primary server may be built in a secondary server, or exist as a functional module of the secondary server (for example, the secondary server and the primary server are used as different virtual machines, are connected by using an I/O interface, and coexist in a same physical server).

It should be further noted that for execution operations of the processor 1701 and other technical features related to the processor 1701, refer to related content of the primary server in the method embodiments in FIG. 2 to FIG. 17. Details are not described herein again.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, another network device) to perform all or some of the operations of the methods described in the embodiment in FIG. 2 of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A data synchronization method, applied to a scenario of multi-process-based data synchronization between a primary server and a secondary server in a non-uniform memory access (NUMA) system, wherein the NUMA system comprises the primary server and the secondary server, the primary server comprises a plurality of NUMA nodes, a second process and a first process belong to processes comprised in a same NUMA node, comprising:
   sending, by a data synchronization process, first data to the secondary server for synchronization, wherein the first data is generated by the first process running on the primary server;
   sending, by the data synchronization process, second data to the secondary server, wherein the second data is generated by the second process; and
   wherein the primary server comprises a completion queue, and an identifier of the second process is located in a first element of the completion queue; and
   waking up, by the data synchronization process, the second process based on completion of synchronization of the first data and the second data by the secondary server; and
   wherein waking up a process corresponding to the identifier comprised in the first element; and
   wherein the first element is a head element of the completion queue; and
   waking up, by the second process, the first process, wherein the second process instead of the data synchronization process wakes up one or more processes, including the first process, included in one or more elements that are in the completion queue and that follow the first element in the completion queue, wherein the data synchronization process only needs to wake up the second processes that have completed data synchronization to relieve a load of the data synchronization process.

2. The method according to claim 1, wherein the method further comprises:
   before the data synchronization process sends the first data to the secondary server, receiving, by the data synchronization process, a data synchronization request corresponding to the first process.

3. The method according to claim 1, wherein the first process is configured to perform a first operation on a database, and the first data comprises an operation record corresponding to the first operation.

4. The method according to claim 1, wherein the second process is configured to perform a second operation on a database, and the second data comprises an operation record corresponding to the second operation.

5. The method according to claim 1, wherein the method further comprises:
   before the second process is woken up, and after the secondary server completes synchronization of the first data, generating the completion queue based on at least the identifier of the second process.

6. The method according to claim 1, wherein an identifier of the first process is located in a second element of the completion queue, and the second element follows the first element in the completion queue; and
   wherein waking up, by the second process, the first process comprises:
   waking up, by the second process, a process corresponding to the identifier comprised in the second element.

7. The method according to claim 6, wherein waking up, by the second process, the process corresponding to the identifier comprised in the second element comprises:
   waking up, by the second process, processes corresponding to identifiers comprised in a plurality of elements that are in the completion queue and that follow the first element.

8. The method according to claim 6, wherein the second element is adjacent to the first element; and wherein waking up, by the second process, the process corresponding to the identifier comprised in the second element comprises:
   waking up, by the second process, a process comprised in an element in the completion queue, wherein the element adjacent to the first element and follows the first element.

9. The method according to claim 1, wherein the primary server comprises a waiting queue, and before the secondary server completes the synchronization, the identifier of the second process is located in a third element in the waiting queue, the identifier of the first process is located in a fourth element in the waiting queue, and the fourth element follows the third element, and wherein the completion queue is generated based on the waiting queue.

10. The method according to claim 9, wherein the completion queue comprises one or more parts of the waiting queue.

11. The method according to claim 9, wherein relative locations of the third element and the fourth element in the waiting queue are the same as relative locations of the first element and a second element in the completion queue.

12. The method according to claim 9, wherein the identifier of the second process is located in a head element of the waiting queue, and the identifier of the first process is located in an element other than the head element in the waiting queue.

13. A data synchronization apparatus, applied to a scenario of multi-process-based data synchronization between a primary server and a secondary server in a non-uniform memory access (NUMA) system, wherein the NUMA system comprises the primary server and the secondary server, the primary server comprises a plurality of NUMA nodes, a second process and a first process belong to processes comprised in a same NUMA node, comprising:
   at least one processor; and
   one or more memories coupled to the at least one processor and storing programming instructions for execution by the at least one processor to cause the apparatus to:
   send, by a data synchronization process, first data to the secondary server for synchronization, wherein the first data is generated by the first process running on the primary server;
   send, by the data synchronization process, second data to the secondary server, wherein the second data is generated by the second process; and
   wherein the primary server comprises a completion queue, and an identifier of the second process is located in a first element of the completion queue; and
   wake up, by the data synchronization process, the second process based on completion of synchronization of the first data and the second data by the secondary server; and
   wherein waking up a process corresponding to the identifier comprised in the first element; and
   wherein the first element is a head element of the completion queue; and
   wake up, by the second process, the first process, wherein the second process instead of the data synchronization process wakes up one or more processes, including the first process, included in one or more elements that are in the completion queue and that follow the first element in the completion queue, wherein the data synchronization process only needs to wake up the second processes that have completed data synchronization to relieve a load of the data synchronization process.

14. The data synchronization apparatus according to claim 13, wherein the programming instructions, when executed by the at least one processor, cause the apparatus to:
    receive, by the data synchronization process, a data synchronization request corresponding to the first process before the data synchronization process sends the first data to the secondary server.

15. The data synchronization apparatus according to claim 13, wherein the first process is configured to perform a first operation on a database, and the first data comprises an operation record corresponding to the first operation.

16. The data synchronization apparatus according to claim 13, wherein the second process is configured to perform a second operation on a database, and the second data comprises an operation record corresponding to the second operation.

17. A non-transitory computer storage medium, storing a computer program, wherein when the computer program is executed by a processor to perform a method, applied to a scenario of multi-process-based data synchronization between a primary server and a secondary server in a non-uniform memory access (NUMA) system, wherein the NUMA system comprises the primary server and the secondary server, the primary server comprises a plurality of NUMA nodes, a second process and a first process belong to processes comprised in a same NUMA node, the method comprising:
    sending, by a data synchronization process, first data to the secondary server for synchronization, wherein the first data is generated by the first process running on the primary server;
    send, by the data synchronization process, second data to the secondary server, wherein the second data is generated by the second process; and
    wherein the primary server comprises a completion queue, and an identifier of the second process is located in a first element of the completion queue; and
    wake up, by the data synchronization process, the second process based on completion of synchronization of the first data and the second data by the secondary server; and
    wherein waking up a process corresponding to the identifier comprised in the first element; and
    wherein the first element is a head element of the completion queue; and
    waking up, by the second process, the first process, wherein the second process instead of the data synchronization process wakes up one or more processes, including the first process, included in one or more elements that are in the completion queue and that follow the first element in the completion queue, wherein the data synchronization process only needs to wake up the second processes that have completed data synchronization to relieve a load of the data synchronization process.

18. The non-transitory computer storage medium according to claim 17, wherein the method further comprises:
    before the data synchronization process sends the first data to the secondary server, receiving, by the data synchronization process, a data synchronization request corresponding to the first process.

19. The non-transitory computer storage medium according to claim 17, wherein the first process is configured to perform a first operation on a database, and the first data comprises an operation record corresponding to the first operation.

20. The non-transitory computer storage medium according to claim 17, wherein the second process is configured to perform a second operation on a database, and the second data comprises an operation record corresponding to the second operation.

21. The non-transitory computer storage medium according to claim 17, wherein the method further comprises:
    before the second process is woken up, and after the secondary server completes synchronization of the first data, generating the completion queue based on at least the identifier of the second process.

* * * * *